(12) United States Patent
Yuasa

(10) Patent No.: US 8,864,885 B2
(45) Date of Patent: Oct. 21, 2014

(54) SHEET-SHAPED GAS ADSORBENT AND INSULATING BODY USING SAME

(75) Inventor: Akiko Yuasa, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/821,175

(22) PCT Filed: Sep. 9, 2011

(86) PCT No.: PCT/JP2011/005075
§ 371 (c)(1),
(2), (4) Date: Mar. 6, 2013

(87) PCT Pub. No.: WO2012/032786
PCT Pub. Date: Mar. 15, 2012

(65) Prior Publication Data
US 2013/0160652 A1 Jun. 27, 2013

(30) Foreign Application Priority Data

Sep. 9, 2010 (JP) ................................ 2010-201643
Nov. 15, 2010 (JP) ................................ 2010-254680

(51) Int. Cl.
*B01D 53/02* (2006.01)
*B01J 20/28* (2006.01)
*B01J 20/18* (2006.01)
*B01D 53/26* (2006.01)

(52) U.S. Cl.
CPC ..... *B01J 20/28033* (2013.01); *B01D 2257/102* (2013.01); *B01J 20/28035* (2013.01); *B01J 20/28026* (2013.01); *B01D 2253/108* (2013.01); *B01D 2253/34* (2013.01); *B01D 53/02* (2013.01); *B01J 20/186* (2013.01); *B01D 53/261* (2013.01)
USPC ............. 96/153; 264/165; 264/572; 252/194; 428/448

(58) Field of Classification Search
USPC ...................... 95/153; 264/165, 572; 252/194; 428/448
See application file for complete search history.

(56) References Cited

U.S. PATENT DOCUMENTS 7,427,436 B2 * 9/2008 Ishihara et al. ................ 428/323

FOREIGN PATENT DOCUMENTS

| EP | 0297538 | 1/1989 |
|----|---------|--------|
| JP | S63-256133 | 10/1988 |
| JP | H2-99139 | 4/1990 |
| JP | H6-18899 B | 3/1994 |
| JP | H7-103389 | 4/1995 |
| JP | 2009-19697 | 1/2009 |
| JP | 2010-31958 | 2/2010 |

OTHER PUBLICATIONS

Translation of JP 2010/031958, Horihata, Feb. 12, 2010.*
Translation of JP 2009/019697, Akeyama, Jan. 29, 2009.*

* cited by examiner

*Primary Examiner* — Christopher P Jones
(74) *Attorney, Agent, or Firm* — Hamre, Schumann, Mueller & Larson, P.C.

(57) ABSTRACT

A sheet-shaped gas adsorbent according to the present invention is composed of at least a thermoplastic resin and copper ion-exchanged ZSM-5 type zeolite (12), and typically represented by, for example, a single layer sheet-shaped gas adsorbent (10), which is configured of dispersing the copper ion-exchanged ZSM-5 type zeolite (12) in the thermoplastic resin sheet (11). Also, the insulating body according to the present invention comprises a sheet-shaped gas adsorbent having the aforementioned configuration, and typically represented by, for example, a configuration, in which a core member and a sheet-shaped gas adsorbent are covered with a sheath member.

12 Claims, 2 Drawing Sheets

SHEET-SHAPED GAS ADSORBENT AND INSULATING BODY USING SAME

TECHNICAL FIELD

The present invention relates to a sheet-shaped gas adsorbent and an insulating body using thereof, and in particular, relates to a sheet-shaped gas adsorbent, which is capable of adsorbing moisture with larger capacitance at an ambient temperature and under low partial pressure, and an insulating body, which is configured by hermetically housing such a sheet-shaped gas adsorbent and a core member at reduced pressure with a sheath member having gas barrier ability.

BACKGROUND ART

Various types of technologies related to resin sheet members containing zeolite are conventionally known. More specifically, typical example thereof includes a technology of adding zeolite to provide antimicrobial property, or a technology of blending zeolite to provide gas adsorbability, or the like. In these technologies, a kneaded mixture of a resin serving as a base material with zeolite is generally formed into a sheet-like member by a known method.

For example, Patent Literature 1 proposes, for the purpose of providing antimicrobial property to organic polymer films, an organic polymer film containing antimicrobial zeolite mixed therein (antimicrobial film). The "antimicrobial zeolite" used here means products obtained by substituting some or all of ion-exchangeable ions in zeolite with silver ion, copper ion, zinc ion and the like. An ethylene gas absorbing composition composed of 5 to 95 parts by weight (pbw) of a resin and 95 to 5 pbw of an ethylene gas absorbent is proposed.

Also, Patent Literature 2 proposes, for the purpose of preserving freshness of a perishable food by effectively absorbing ethylene gas emitted from the perishable food, an ethylene gas absorbing composition composed of 5 to 95 Pbw of a resin and 95 to 5 pbw of ethylene gas absorbent is proposed. The "ethylene gas absorbent" used here means a mixture of synthetic zeolite and a metallic oxide. Further, this ethylene gas absorbing composition is processible into a film, a sheet, a container or the like.

Further, Patent Literature 3 proposes, for the purpose of obtaining an adsorbing material that retain an adsorbent without deteriorating an adsorptive performance of the adsorbent as possible, an adsorbing material obtained by extruding a synthetic resin containing 1 to 50% wt. of zeolite based adsorbent blended therein to stretch thereof into film-shape. The adsorptive performance of this adsorbing material is evaluated in examples by means of adsorption of ammonia and hydrogen sulfide.

Further, Patent Literature 4 proposes a vacuum insulation member employing a polyethylene terephthalate (PET) film and a polyethylene (PE) film, in which zeolite is mixed and kneaded as a getter material. This vacuum insulation member is configured such that a multilayer film formed by laminating a PET film, an aluminum foil and a PE film is formed into a bag-shape to provide a sheath member, and the inside of the formed sheath member is filled with a core material or an aggregate (powder silica), and further, the inside of sheath member is evacuated via a vacuum and tightly closed. In addition, zeolite (or zeolite and activated carbon) is mixed and kneaded in the PET film and the PE film constituting the aforementioned sheath member. This allows that moisture, carbon dioxide and the like from the outside of the sheath member are adsorbed by the getter material before entering to the inside thereof.

CITATION LIST

Patent Literature

Patent Literature 1: Japanese Examined Patent Publication No. H06-18899B (1994)
Patent Literature 2: Japanese Laid-Open Patent Application Publication No. H02-99139A (1990)
Patent Literature 3: Japanese Laid-Open Patent Application Publication No. S63-256133A (1988)
Patent Literature 4: Japanese Laid-Open Patent Application Publication No. H07-103389A (1995)

SUMMARY OF INVENTION

Technical Problem

While the resin sheet members disclosed in Patent Literatures 1 to 4 are configured to adsorb gases such as ethylene gas, ammonia, hydrogen sulfide, moisture, carbon dioxide and the like, none of these assumes adsorbing air, and further, none of these can sufficiently adsorb moisture (in particular, moisture vapor) contained in the air at a temperature within the ambient temperature range.

More specifically, first, since zeolite is added to the antimicrobial film proposed in Patent Literature 1 to provide antimicrobial property as its name suggests, it is not designed to allow sufficient adsorption of gases such as air and moisture vapor and the like.

Here, typical method for achieving enhanced activation of zeolite so as to adsorb larger amount of gas may be a method of introducing cation (in particular, metallic ion) by conducting an ion exchange for zeolite as described Patent Literature 1. Further, Patent Literature 1 describes specific examples for types (grades) of zeolite and types of metallic ion to be introduced to zeolite, and preferable ranges for the thickness of the antimicrobial film, the content of the antimicrobial zeolite and the like are also disclosed. However, the type of zeolite, the supply of cation, the thickness of the antimicrobial film, the content and the like are the conditions for achieving the antimicrobial property but are not the conditions suitable for the adsorption of moisture vapor and air.

In the next, the ethylene gas absorbing composition proposed in Patent Literature 2 is specialized for the ethylene gas absorption as its name suggests, but is not configured to effectively adsorb other types of gases. Further, while the mixing ratio of the ethylene gas absorbent contained in the ethylene gas absorbing composition over the resin is specified and the general formula of the synthetic zeolite is described, none of the descriptions of the type (grade) of zeolite and the supply of cation to zeolite is particularly included.

Also, while Patent Literature 3 does not specify a specific object to be adsorbed by the adsorbing material proposed in this Literature, the evaluation of the adsorptive performance is conducted with ammonia and hydrogen sulfide in Examples in the Specification as described above, but no particular reference related to the adsorption of air and moisture vapor is made. Further, while the range of the blending quantity of zeolite contained in this adsorbing material over the synthetic resin is described, no description on the type (grade) of zeolite is made. In addition, no particular description on the supply of cation to zeolite is made, and there is only a suggestion for the supply of cation, suggested from the description of adding ferric hydroxide and calcium hydroxide in zeolite.

Also, while the object of the vacuum insulation member proposed in Patent Literature 4 is to prevent the penetration of carbon dioxide, moisture, and the like in the inside of the vacuum insulation member, there is only a description that the object to be adsorbed by the PET film and the PE film, which correspond to the resin sheet member, is carbon dioxide and moisture, but no particular description on the adsorption of air is made. In addition, substantially no specific description on zeolite added to the PET film and the PE film is made, and there is also no description on the type (grade) of zeolite, and no description on whether or not cation is introduced to zeolite.

Further, it is clarified according to the results of the intent study of the present inventors that metallic ion introduced in zeolite may cause an erosion of the resin due to its catalytic action, depending upon the conditions for the production of the resin sheet member, which may possibly result in obstructing the sheet forming.

For example, in Examples of Patent Literature 1, vinylidene chloride resin, polyethylene, polyurethane, and ABS resin are exemplified as the resins, and a T-die process and a co-extrusion process are exemplified as the forming process, and further, the temperatures of 200 degrees C. to 260 degrees C. are exemplified as the forming temperature. Also, in Patent Literature 2, polyethylene, polypropylene and polystyrene are exemplified as the resins, and the inflation forming process is exemplified, and further, the temperatures of 130 to 140 degrees C. are exemplified as the forming temperature. Further, in Examples of Patent Literature 3, polypropylene is exemplified as the resin, and the inflation forming process after the extruding and kneading process, and the T-die process are exemplified as the forming process, and further, the temperatures of 200 degrees C. to 250 degrees C. are exemplified as the kneading temperature and the forming temperature.

However, the resin is deteriorated by the catalytic action of metallic ion introduced in zeolite under such forming conditions including such a higher temperature, and a defect such as a cleavage, a crack, a discoloration and the like may be possibly caused in the sheet (or film). In addition to above, while no particular description related to the forming process and the forming temperature is included in Patent Literature 4, there is a fear that the resin may be deteriorated by the catalytic action of metallic ion if the heating temperature during the kneading process or during the forming process is high.

Further, even if the above-described resin sheet members disclosed in Patent Literature 1 to 4 are employed in the sheath member of the vacuum insulation member disclosed in Patent Literature 4, sufficient amounts of moisture and air cannot be adsorbed. Thus, there is a concern that the thermal conductivity of the vacuum insulation member is increased.

More specifically, the inside of the bag-shaped sheath member is depressurized with a vacuum pump as described above on the occasion of the production of the vacuum insulation member, and moisture may be adhered on the inner surface of the sheath member or the core member before the depressurization. At this time, since the inside of the sheath member is stuffed with the core member, sufficient suction of air and moisture (hereinafter, "air and moisture" is referred to as "air and the like") cannot possibly be achieved, even if the internal air is suctioned with the vacuum pump. When such an air remains in the inside of the sheath member, the level of the vacuum in the inside is decreased to cause increased thermal conductivity. While the remained air and the like in the inside would be adsorbed to be removed if the resin sheet member constituting the sheath member could adsorb larger amount of the air and the like, it is difficult to achieve the sufficient absorbing quantity by the use of the above-described conventional resin sheet member, and thus the effective adsorptive removal of the air and the like remained in the inside cannot be achieved.

In addition, even if it is configured such that the sheath member has the gas barrier ability, the member cannot completely inhibit the permeation of the air and the like, and thus there is a concern that the air and the like may enter in the inside of the sheath member as time advances. While the penetration of the air and the like would be substantially avoided if the resin sheet member constituting the sheath member could adsorb a large quantity of the air and the like in this case, it is difficult to achieve the sufficient absorbing quantity by the use of the above-described conventional resin sheet member, and thus, in reality, the penetration of the air and the like from the outside cannot be avoided.

The present invention is made in order to solve the problems as described above, and an object of the present invention is to provide a sheet-shaped gas adsorbent, which contains zeolite, and is capable of adsorbing increased amount of moisture of low partial pressure in the ambient temperature range and air, and an insulating body employing the above-described sheet-shaped gas adsorbent, which exhibits enhanced thermal insulation performance and enhanced durability over time.

Solution to Problem

The sheet-shaped gas adsorbent according to the present invention is, in order to solve the above-described problems, composed of at least: a thermoplastic resin; and ZSM-5 (Zeolite Socony Mobil-#5) type zeolite configured by an ion exchange with copper ion.

Also, the insulating body according to the present invention is configured, in order to solve the above-described problems, to be configured by covering at least a core member and a sheet-shaped gas adsorbent having gas barrier ability with a sheath member and depressurizing the inside of the sheath member, in which the aforementioned sheet-shaped gas adsorbent includes at least ZSM-5 type zeolite configured by an ion exchange with copper ion and a thermoplastic resin.

Since the aforementioned configuration contains the sheet-shaped gas adsorbent containing the copper ion-exchanged ZSM-5 type zeolite, the moisture, which has been adhered to the core member and/or the sheath member and has not yet been completely removed, can be removed via the adsorption by the sheet-shaped gas adsorbent. In addition, the pressure in the inside of the sheath member for the insulating body can be further reduced, and the air and/or the moisture entered through the sheath member as time advances can also be adsorbed to be removed by the sheet-shaped gas adsorbent. Hence, the insulating body exhibiting enhanced thermal insulation performance and enhanced durability over time can be provided. In addition, since the gas adsorbent is sheet-shaped, a concern of deteriorating the appearance at the time of being applied to the insulating body can be avoided.

The above objects, other objects, features and advantages of the present invention will be apparent from the following detailed description of the preferred embodiments in reference to the annexed figures.

Advantageous Effects of the Invention

As described above, the present invention exhibits the advantageous effects of allowing to provide a sheet-shaped gas adsorbent, which contains zeolite, and is capable of adsorbing increased amount of moisture of low partial pressure in the ambient temperature range and air, and an insulating body employing the above-described sheet-shaped gas adsorbent, which exhibits enhanced thermal insulation performance and enhanced durability over time.

DESCRIPTION OF EMBODIMENTS

Figure 1:
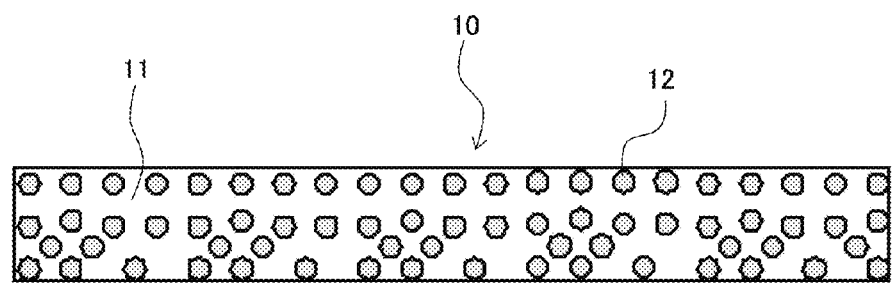
FIG. 1 is a schematic cross-sectional view, illustrating an example of a sheet-shaped gas adsorbent having a single layer structure according to Embodiment 1 of the present invention.

A sheet-shaped gas adsorbent according to the present invention is composed of at least a thermoplastic resin and ZSM-5 type zeolite configured by an ion exchange with copper ion.

According to the above-described configuration, the copper ion-exchanged ZSM-5 type zeolite is capable of sufficiently adsorbing larger volume of moisture within the range of the ambient temperature under the low partial pressure, as well as being capable of adsorbing air. Thus, the sheet-shaped gas adsorbent, which is capable of adsorbing water vapor at an ambient temperature with larger adsorbing capacitance and also capable of adsorbing air, can be obtained. Hence, the sheet-shaped gas adsorbent exhibiting high performance can be applied for devices having limited space for the installation of the gas adsorbent such as a precision instrument and the like.

In the sheet-shaped gas adsorbent of the aforementioned configuration, the blending quantity of the aforementioned ZSM-5 type zeolite configured by an ion exchange with copper ion may be equal to or lower than 40 parts by weight (pbw) for 100 pbw of the aforementioned thermoplastic resin.

According to the aforementioned configuration, the blending quantity of the copper ion-exchanged ZSM-5 type zeolite over the thermoplastic resin component can be controlled within a preferable range. Hence, a fear of causing a defect such as a crack, a cleavage and the like in the sheet-shaped gas adsorbent is diminished to provide improved strength, as well as achieving reduced thickness of on the order of 1 to 10 μm. As a result, the obtained sheet-shaped gas adsorbent can be applied in further narrower space.

In the sheet-shaped gas adsorbent having the aforementioned configuration, the aforementioned thermoplastic resin may be blended with at least the aforementioned ZSM-5 type zeolite and then may be thermally formed to the sheet-like shape, and the temperature of the thermoplastic resin in the aforementioned thermally forming process may be equal to or lower than a heating upper limit temperature, which is higher than the softening point of the thermoplastic resin by 60 degrees C.

According to the aforementioned configuration, the thermoplastic resin sheet containing the copper ion-exchanged ZSM-5 type zeolite and the thermoplastic resin component is thermally formed to allow easy production of the sheet-shaped gas adsorbent, and the temperature of the thermoplastic resin in the thermally forming process is defined at a temperature of equal to or lower than the aforementioned heating upper limit temperature, so that a concern for causing a copper corrosion by an erosion of the thermoplastic resin component due to copper ion contained in the copper ion-exchanged ZSM-5 type zeolite can be diminished. Hence, the sheet-shaped gas adsorbent with enhanced quality having improved strength can be provided.

In the sheet-shaped gas adsorbent of the aforementioned configuration, the aforementioned ZSM-5 type zeolite configured by the ion exchange with copper ion may be configured to be subjected to a thermal drying processing in advance before it is blended to the aforementioned thermoplastic resin and thermally formed to the sheet-like shape.

The aforementioned configuration allows eliminating the moisture, which has been previously contained in the copper ion-exchanged ZSM-5 type zeolite, so that the adsorptive performance of the obtained sheet-shaped gas adsorbent can be further improved.

In the sheet-shaped gas adsorbent of the aforementioned configuration, the aforementioned ZSM-5 type zeolite configured by the ion exchange with copper ion may be configured to be subjected to a vacuum thermal processing in advance before it is blended to the aforementioned thermoplastic resin and thermally formed to the sheet-like shape.

According to the aforementioned configuration, the moisture previously contained in the copper ion-exchanged ZSM-5 type zeolite can be eliminated to provide improved adsorptive performance for the moisture. Further, $Cu^{2+}$ contained in the copper ion-exchanged ZSM-5 type zeolite can be reduced to $Cu^+$, such that the adsorptive performance for the air can also be improved. Hence, the adsorptive performance of the obtained sheet-shaped gas adsorbent can be further improved.

In the sheet-shaped gas adsorbent of the aforementioned configuration, when the aforementioned sheet-shaped gas adsorbent is presumed to serve as an intermediate layer, the gas adsorbent may be configured to further comprise an overlying member and an underlying member, both of which are laminated over said intermediate layer.

Since the aforementioned configuration includes, for example, the overlying member and the underlying member, which allows moderating the adsorption of larger quantity of the water or the air by the sheet-shaped gas adsorbent before the practical use due to the presence of the overlying member and the underlying member, a fear for saturating and deteriorating the adsorbing ability can be diminished.

An insulating body according to the present invention is configured such that at least a core member and a sheet-shaped gas adsorbent are covered with a sheath member having gas barrier ability and the inside of the sheath member is depressurized, in which the aforementioned sheet-shaped gas adsorbent comprises at least ZSM-5 type zeolite configured by an ion exchange with copper ion and a thermoplastic resin.

Since the aforementioned configuration includes the sheet-shaped gas adsorbent containing the copper ion-exchanged ZSM-5 type zeolite, the moisture, which has been adhered to the core member and/or the sheath member and has not yet been not completely removed, can be removed via the adsorption by the sheet-shaped gas adsorbent. In addition, the pressure in the inside of the sheath member for the insulating body can be further reduced, and the air and/or the moisture entered through the sheath member as time advances can also be removed via the adsorption by the sheet-shaped gas adsorbent. Hence, the insulating body exhibiting enhanced thermal insulation performance and enhanced durability over time can be provided. In addition, since the gas adsorbent is sheet-shaped, a concern of deteriorating the appearance in the application of insulating body can be avoided.

Concerning the insulating body of the aforementioned configuration, the blending quantity of the aforementioned ZSM-5 type zeolite configured by the ion exchange with copper ion in the aforementioned sheet-shaped gas adsorbent may be equal to or lower than 40 parts by weight (pbw) over 100 pbw of the aforementioned thermoplastic resin.

According to the aforementioned configuration, the blending quantity of the copper ion-exchanged ZSM-5 type zeolite over the thermoplastic resin component can be controlled within a preferable range. Hence, a fear for causing a defect such as a crack, a cleavage and the like in the sheet-shaped gas adsorbent can be diminished to provide improved strength, as well as achieving reduced thickness of around 1 to 10 µm. As a result, the obtained insulating body is constituted to prevent adverse effects of the presence of the sheet-shaped gas adsorbent on the appearance, and also, a concern for affecting the thermal conductivity of the sheet-shaped gas adsorbent itself can be minimized.

In the insulating body of the aforementioned configuration, the aforementioned thermoplastic resin in the aforementioned sheet-shaped gas adsorbent may be blended with at least the aforementioned ZSM-5 type zeolite and may be thermally formed to the sheet-like shape, and the temperature of the thermoplastic resin in the aforementioned thermally forming may be equal to or lower than the heating upper limit temperature, which is higher than the softening point of the thermoplastic resin by 60 degrees C.

According to the aforementioned configuration, the thermoplastic resin sheet containing the copper ion-exchanged ZSM-5 type zeolite and the thermoplastic resin component is thermally formed to allow easy production of the sheet-shaped gas adsorbent, and the temperature of thermoplastic resin in the thermally forming process is defined at a temperature of equal to or lower than the aforementioned heating upper limit temperature, so that a concern for causing a copper corrosion by an erosion of the thermoplastic resin component due to copper ion contained in the copper ion-exchanged ZSM-5 type zeolite can be inhibited. As a result, the obtained insulating body is constituted to avoid the influence to the appearance and the like due to the presence of the sheet-shaped gas adsorbent, and also, a concern for affecting the thermal conductivity of the sheet-shaped gas adsorbent itself can be minimized.

In the insulating body of the aforementioned configuration, the aforementioned ZSM-5 type zeolite configured by the ion exchange with copper ion in the aforementioned sheet-shaped gas adsorbent may be configured to be subjected to a thermal drying processing in advance before it is blended to the aforementioned thermoplastic resin and thermally formed to the sheet-like shape.

The aforementioned configuration allows eliminating the moisture, which is previously contained in the copper ion-exchanged ZSM-5 type zeolite before producing the sheet-shaped gas adsorbent, so that the moisture that is present in the interior of the insulating body can be removed via the adsorption by the sheet-shaped gas adsorbent, and the moisture entered through the sheath member as time advances can also be removed via the adsorption by the sheet-shaped gas adsorbent. As a result, the insulating body exhibiting enhanced thermal insulation performance and enhanced durability over time can be provided.

In the insulating body of the aforementioned constitution, the aforementioned ZSM-5 type zeolite configured by the ion exchange with copper ion in the aforementioned sheet-shaped gas adsorbent may be configured to be subjected to a vacuum thermal processing in advance before it is blended to the aforementioned thermoplastic resin and thermally formed to the sheet-like shape.

According to the aforementioned configuration, the moisture previously contained in the copper ion-exchanged ZSM-5 type zeolite can be eliminated before producing the sheet-shaped gas adsorbent, so that improved adsorptive performance can be achieved for the moisture that is present in the interior of the insulating body and for the moisture that is entered as time advances. Further, $Cu^{2+}$ contained in the copper ion-exchanged ZSM-5 type zeolite can be reduced to $Cu^+$, so that improved adsorptive performance can be achieved for the moisture that is present in the interior of the insulating body and for the moisture that is entered as time advances. As a result, the insulating body exhibiting enhanced thermal insulation performance and enhanced durability over time can be provided.

In the insulating body of the aforementioned configuration, it may be configured that the aforementioned sheet-shaped gas adsorbent is integrated with the inside of the aforementioned sheath member.

According to the aforementioned configuration, for example, a laminate film composed of the sheet-shaped gas adsorbent integrally laminated over the inside of the sheath member is employed. Hence, it is not necessary to provide the sheet-shaped gas adsorbent in the inside of the sheath member, so that a process step for providing the sheet-shaped gas adsorbent can be omitted from the production process for the insulating body. In addition, since the sheath member itself acquires the adsorptive performance for the moisture and for the air, the insulating body exhibiting enhanced thermal insulation performance and enhanced durability over time can be provided.

In addition, for example, the configuration of laminating the sheet-shaped gas adsorbent between a gas barrier layer and a thermally welded layer may be employed as the laminate film, so that a concern for saturating and deteriorating the adsorbing ability due to the adsorption of larger quantity of the water and/or the air by the sheet-shaped gas adsorbent before the practical use can be inhibited.

Hereinafter, preferable Embodiments of the present invention will be described in reference to the annexed figures. In the following descriptions, the same reference numerals are assigned to identical or correspondent elements throughout the separate views, and the duplicated descriptions thereof are not presented.

Embodiment 1

Sheet-Shaped Gas Adsorbent

FIG. 1 is a schematic cross-sectional view, illustrating an example of a sheet-shaped gas adsorbent 10 of a single layer structure, serving as a sheet-shaped gas adsorbent according to Embodiment 1 of the present invention. As shown in FIG. 1, the single layer sheet-shaped gas adsorbent 10 according to the present embodiment is configured such that copper ion-exchanged ZSM-5 type zeolite 12 is dispersed in thermoplastic resin sheet 11 that is the sheet main body.

The thermoplastic resin sheet 11 is obtained by forming a thermoplastic resin composition composed of at least a thermoplastic resin into a sheet-like shape. While the thermoplastic resin employed in the present invention is not particularly limited to any specific resin, typical thermoplastic resin includes: vinyl resins such as polyethylene (PE), polypropylene (PP), polystyrene (PS) and the like; acrylic resins such as polymethyl methacrylate (PMMA), polyethyl methacrylate (PEMA), polymethyl acrylate (PMA), polyethyl acrylate (PEA) and the like; acrylonitrile-styrene based resins such as acrylonitrile-styrene copolymer (AS resin), acrylonitrile-butadiene-styrene copolymer (ABS resin) and the like; polyamide resins such as nylons and the like; polyester resins such as polyethylene terephthalate (PET), polybutylene terephthalate (PBT) and the like; Polycarbonate (PC); and the like, though it is not particularly limited thereto. Among these, polyethylene, polypropylene, nylon and the like are preferably employed, in view of moldability, production cost and the like.

The thermoplastic resin composition may be composed by employing one of the above-described thermoplastic resins alone, or may be composed by employing a suitable combination of two or more of these resins. In addition, the thermoplastic resin composition may contain other component except the thermoplastic resin. More specifically, for example, various types of additives such as an antioxidant, a stabilizer, a plasticizer, a fire retardant agent, a coloring agent, a dispersant, a modifier, and the like; fillers such as inorganic particles, inorganic staple fibers and the like; may be employed. Or, a different adsorbent for adsorbing a gas, other than the copper ion-exchanged ZSM-5 type zeolite 12, may be contained.

The shape of the thermoplastic resin sheet 11 is the sheet-like shape as described above, and the "sheet-like" in the present invention is defined as a shape having a two-dimensional expansion and having a thickness of equal to or larger than 1 µm and equal to or smaller than 1 mm (1,000 µm). Therefore, other dimensional aspects of the thermoplastic resin sheet 11 such as length or width or the like are not particularly limited, and may be suitably designed according to applications.

The copper ion-exchanged ZSM-5 type zeolite 12 dispersed in the thermoplastic resin sheet 11 is a gas adsorbing component, and is configured by conducting an ion exchange for the ZSM-5 type zeolite to introduce copper ion. The ZSM-5 type zeolite is a mordenite framework inverted (MFI) type zeolite, which is broadly utilized as a catalyst of reactions for decomposing hydrocarbon.

The shape of the copper ion-exchanged ZSM-5 type zeolite 12 is not particularly limited, and may be in powder form, or may be in granular form. The copper ion-exchanged ZSM-5 type zeolite 12 is capable of sufficiently adsorbing larger volume of moisture under the low partial pressure (water vapor) at a temperature within the range of the ambient temperature, as well as being capable of adsorbing air. Hence, the adsorptive removal of the moisture in the applied space can be highly achieved in the state that it is dispersed in the thermoplastic resin sheet 11, and the adsorptive removal of the air can also be sufficiently achieved. Meanwhile, the method for preparing the copper ion-exchanged ZSM-5 type zeolite 12 will be described later.

It is only necessary for the single layer sheet-shaped gas adsorbent 10 according to the present embodiment that the copper ion-exchanged ZSM-5 type zeolite 12 may be dispersed in the thermoplastic resin sheet 11 as described above, and the production process and the production conditions are not particularly limited. While the adding quantity (blending quantity) of the copper ion-exchanged ZSM-5 type zeolite 12 is not particularly limited, it is preferable that the upper limit thereof is equal to or lower than 40 pbw over 100 pbw of the aforementioned thermoplastic resin. In addition, it is also preferable that the lower limit is equal to or higher than 10 pbw.

The adding quantity of the copper ion-exchanged ZSM-5 type zeolite 12 within this range allows effectively inhibiting the copper corrosion due to copper ion during the thermal forming process, so that sufficient strength can be obtained and improved adsorption of the moisture and the air can be achieved, without generating a defect such as a crack or a cleavage or the like in the single layer sheet-shaped gas adsorbent 10. On the other hand, if the blending quantity of the copper ion-exchanged ZSM-5 type zeolite 12 is out of the aforementioned range, a crack or a cleavage or the like may be generated in the single layer sheet-shaped gas adsorbent 10 due to the copper corrosion to cause a concern of deteriorating the appearance, or the moisture and the air may not be sufficiently adsorbed.

Now an example of a process for producing the single layer sheet-shaped gas adsorbent 10 will be described, in which such a production process typically includes process steps of: the raw materials are blended (blending step), the raw materials are heated and kneaded with a kneading machine or a processing machine or the like (kneading step), and the kneaded product is formed into a sheet-like form with the processing machine (forming step).

More specifically, in the blending step, pellets of one or more of resins constituting the thermoplastic resin composition, and the copper ion-exchanged ZSM-5 type zeolite 12, and additives if required, may be blended to achieve predetermined blending formulations of the respective components. Here, the product configured by blending these components is referred to as "compound", as a matter of convenience of descriptions. At this time, in order to improve the dispersibility of the copper ion-exchanged ZSM-5 type zeolite 12 in the thermoplastic resin composition, a known dispersant, typically a lubricant such as, for example, paraffin or the like, may be preferably employed as the aforementioned additive. In such case, the blending ratio of the dispersant is not particularly limited.

In the kneading step, the aforementioned compound may be thermally kneaded by employing a known kneading machine, or may be thermally kneaded in a kneading section of a processing machine without conducting a preliminary kneading. Since the compound is supplied from the hopper into the kneading section (screw cylinder or the like) to conduct an extrusion while thermally kneading the compound in the general extruder, the kneading step and the forming step may be substantially simultaneously conducted. Here, the product in the state that the compound is thermally kneaded by conducting the kneading step is referred to as "kneaded product," as a matter of convenience of descriptions.

The type of the processing machine employed in the forming step is not particularly limited, and a known extruder, a film cast apparatus and the like may be preferably employed. In addition, the forming conditions and the like is not particularly limited, and preferable conditions may be suitably adopted according to the composition, the thickness, the shape, the dimension and the like of the single layer sheet-shaped gas adsorbent 10 that is to be produced.

Here, it is sufficient that the temperature applied to the kneaded product may be equal to or lower than the temperature, which is higher than the softening point (softening temperature) of the employed thermoplastic resin by 60 degrees C. in kneading step and/or forming step. Here, the "temperature, which is higher than the softening point of the thermoplastic resin by 60 degrees C." is referred to as "heating upper limit temperature", as a matter of convenience of descriptions. If the temperature of the thermoplastic resin composition is not beyond the heating upper limit temperature under the condition that the thermoplastic resin composition and the copper ion-exchanged ZSM-5 type zeolite 12 are mixed in the process for producing the single layer sheet-shaped gas adsorbent 10, a concern of causing a copper corrosion due to copper ion of the copper ion-exchanged ZSM-5 type zeolite 12 can be effectively inhibited. Hence, the possibility of causing a defect such as a discoloration, a crack, a cleavage and the like in the obtained sheet-shaped gas adsorbent can be effectively diminished.

In such case, when two or more types of the thermoplastic resins are employed, the heating upper limit temperature may be defined by taking the softening point of the thermoplastic resin of larger blending quantity as the reference, or the heating upper limit temperature may be defined by taking the softening point of the whole thermoplastic resin composition as the reference, not taking that of the each of the thermoplastic resins. In addition, even if the type of the thermoplastic resin is identical, the softening point thereof varies depending upon the polymerization degree and the like. Then, it is particularly preferable to define the heating upper limit temperature after identifying the softening point of the employed thermoplastic resin. For example, while the softening point of high density polyethylene (HDPE) is ordinarily 130 degrees C. and thus the heating upper limit temperature is 190 degrees C., the softening point varies within the range from about 100 to 140 degrees C. depending on the polymerization degree, and therefore the heating upper limit temperature may be defined after the associated softening point depending upon the polymerization degree is identified, instead of defining the heating upper limit temperature without exception.

[Preparation of Copper Ion-Exchanged ZSM-5 Type Zeolite]

In the next, the method for preparing the copper ion-exchanged ZSM-5 type zeolite 12 will be specifically described. The copper ion-exchanged ZSM-5 type zeolite 12 is prepared by: conducting the ion exchange with copper ion for the commercially available ZSM-5 type zeolite (copper ion exchanging step); thereafter rinsing thereof with water (rinsing step); and further, thereafter drying thereof (drying step).

The copper ion exchanging process may be conducted with a known method. In general, typical method includes dipping thereof in an aqueous solution of a soluble salt of copper such as copper chloride aqueous solution or copper nitrate aqueous solution or the like. Among these, it is preferable to conduct the copper ion exchange by the method employing $Cu^{2+}$ solution containing carboxylato such as copper (II) propionate or copper (II) acetate or the like. The copper ion-exchanged ZSM-5 type zeolite 12 obtained by using these solutions can exhibit relatively increased adsorption activity for the air.

It is only necessary to conduct the rinsing step by sufficiently rinsing the copper ion-exchanged ZSM-5 type zeolite 12 with an ion-exchange water or the like after the copper ion exchanging process step. Also, it is only necessary to conduct the drying step after the rinsing step so as to sufficiently remove water that adheres onto the surface of the copper ion-exchanged ZSM-5 type zeolite 12. In addition to above, the drying method is not particularly limited, and ordinarily a thermal drying or a drying under a reduced pressure may be adopted.

In this case, the copper ion-exchanged ZSM-5 type zeolite 12 after the completion of the drying step (after the preparation) may be employed for production of the single layer sheet-shaped gas adsorbent 10 without any treatment, and on the other hand, the moisture in the air may be possibly adsorbed during the storage after the preparation. Thus, the drying processing may be conducted before presenting the single layer sheet-shaped gas adsorbent 10 for the production. This allows eliminating the moisture, which has been previously contained in the copper ion-exchanged ZSM-5 type zeolite 12, so that the obtained single layer sheet-shaped gas adsorbent 10 is capable of adsorbing further larger volume of the moisture.

In addition to above, the drying processing before the production of the single layer sheet-shaped gas adsorbent 10 may be through a thermal processing, or through a vacuum thermal processing. While the heating temperature is not particularly limited in the case of the thermal processing, the temperature range of 100 degrees C. to 300 degrees C. allows about 90 to 95% of the moisture contained in the copper ion-exchanged ZSM-5 type zeolite 12 to be dried and removed.

In addition, when the copper ion-exchanged ZSM-5 type zeolite 12 is processed via the vacuum thermal processing, the condition thereof may be preferably at the pressure of equal to or lower than 10 mPa, and more preferably equal to or lower than 1 mPa. In addition, it may be preferable that the heating temperature is equal to or higher than 300 degrees C., and it may be more preferable within the range of 500 to 600 degrees C. The copper ion-exchanged ZSM-5 type zeolite 12 is processed via the vacuum thermal processing to allow eliminating the moisture previously contained in the copper ion-exchanged ZSM-5 type zeolite 12, and further, inducing a reduction of $Cu^{2+}$ contained in the copper ion-exchanged ZSM-5 type zeolite 12 into $Cu^+$. The single layer sheet-shaped gas adsorbent 10 obtained by this reduction of copper ion can achieve higher air adsorption activity and provides further improved air adsorption function.

In addition to above, it is not required to conduct the vacuum thermal processing for the copper ion-exchanged ZSM-5 type zeolite 12, depending on the level of the adsorptive performance required for the single layer sheet-shaped gas adsorbent 10. In addition, if the moisture elimination is prioritized, it is only necessary to achieve the pressure reduction even though the heating temperature may be lower than 300 degrees C., but in order to promote the reduction from $Cu^{2+}$ to $Cu^+$, it is preferable that the temperature is equal to or higher than 300 degrees C.

As described above, the single layer sheet-shaped gas adsorbent 10 in the present embodiment contains the copper ion-exchanged ZSM-5 type zeolite 12, which is capable of adsorbing the moisture of low partial pressure at a temperature within the range of the ambient temperature with increased absorbing capacity and is also capable of adsorbing air, and this gas adsorbent is retained by the thermoplastic resin sheet 11. Hence, since the copper ion-exchanged ZSM-5 type zeolite 12 is capable of adsorbing increased amount of moisture and is also capable of adsorbing air, the single layer sheet-shaped gas adsorbent 10 can highly achieve the adsorptive removal of the moisture in the applied space, and can also achieve the adsorptive removal of the air.

While the single layer sheet-shaped gas adsorbent 10 is configured to contain the copper ion-exchanged ZSM-5 type zeolite 12 dispersing in the thermoplastic resin sheet 11 in the present embodiment, the present invention is not limited thereto, and it is only necessary to be composed of at least the thermoplastic resin and the copper ion-exchanged ZSM-5 type zeolite 12. Therefore, for example, it may be configured that the layer of the copper ion-exchanged ZSM-5 type zeolite 12 is laminated on the thermoplastic resin sheet 11, or the like, and the specific configuration thereof may be suitably selected according to the application of the sheet-shaped gas adsorbent, and thus is not particularly limited.

Embodiment 2

Figure 2:
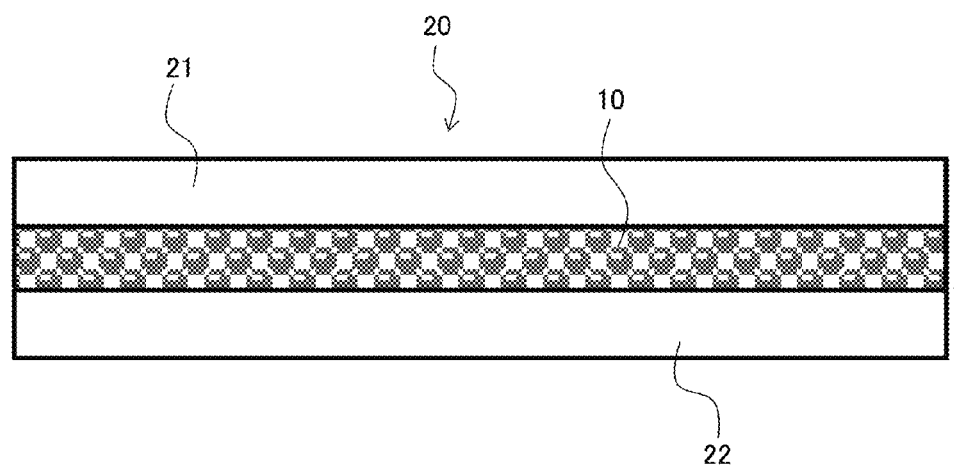
FIG. 2 is a schematic cross-sectional view, illustrating an example of a sheet-shaped gas adsorbent having a multiple-layered (triple-layered) structure according to Embodiment 2 of the present invention.

While the sheet-shaped gas adsorbent according to the aforementioned Embodiment 1 is in a single layer configuration, the sheet-shaped gas adsorbent according to Embodiment 2 of the present invention may be in a multiple-layered configuration. An example of a sheet-shaped gas adsorbent having such a multiple-layered configuration will be specifically described in reference to FIG. 2. FIG. 2 is a schematic cross-sectional view, illustrating an example of a triple-layered sheet-shaped gas adsorbent 20 according to the present embodiment.

As shown in FIG. 2, the triple-layered sheet-shaped gas adsorbent 20 is configured to have the single layer sheet-shaped gas adsorbent 10 described in the aforementioned embodiment 1, which serves as an intermediate layer, and an overlying member 21 and an underlying member 22 are laminated on upper and lower surfaces thereof, respectively. The specific configurations of the overlying member 21 and the underlying member 22 are not particularly limited, and known resin sheets may be suitably selected to be employed. For example, typical configuration is to employ protective members for the overlying member 21 and the underlying member 22, in order to protect the single layer sheet-shaped gas adsorbent 10 serving as the intermediate layer.

The production process of the triple-layered sheet-shaped gas adsorbent 20 is not particularly limited, and typical method may include: a method for laminating the overlying member 21 and the underlying member 22 on the upper and the lower surfaces of the single layer sheet-shaped gas adsorbent 10, respectively; a method for coating with liquid raw material compositions for the overlying member 21 and for the underlying member 22 and curing thereof, or a method for extruding three layers composed of the overlying member 21, the single layer sheet-shaped gas adsorbent 10, and the underlying member 22.

As described above, according to the present embodiment, various types of layers may be laminated to be employed according to the application of the single layer sheet-shaped gas adsorbent 10. Since the overlying member 21 and the underlying member 22 in the above-described example are protective members, a concern for deteriorating the adsorptive performance before the practical use due to the adsorption of the water or the air during the storage of the single layer sheet-shaped gas adsorbent 10 can be diminished. Hence, the single layer sheet-shaped gas adsorbent 10, which serves as the intermediate layer of the triple-layered sheet-shaped gas adsorbent 20, can highly achieve the adsorptive removal of the moisture in the applied space and can also achieve the adsorptive removal of the air.

Embodiment 3

Figure 3:
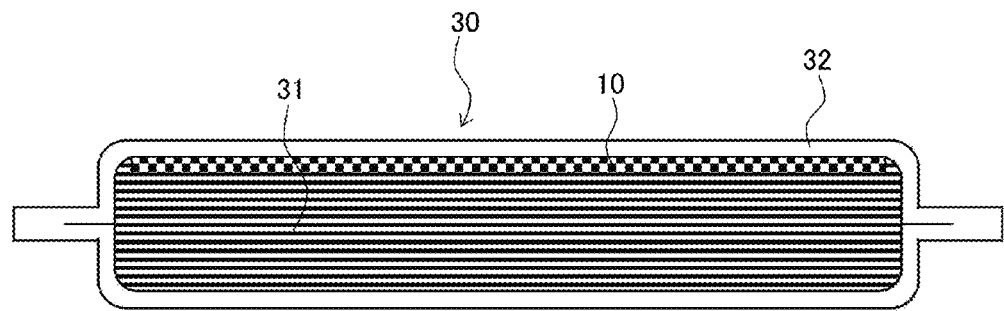
FIG. 3 is a schematic cross-sectional view, illustrating an example of a configuration of an insulating body according to Embodiment 3 of the present invention.

While the invention related to the sheet-shaped gas adsorbent has been specifically described in each of the aforementioned embodiments 1 and 2, an insulating body employing the above-described sheet-shaped gas adsorbent will be specifically described in the present embodiment. FIG. 3 is a schematic cross-sectional view, illustrating an example of a configuration of an insulating body according to Embodiment 3 of the present invention.

As shown in FIG. 3, an insulating body 30 according to the present embodiment includes a core member 31, a sheath member 32 having gas barrier ability, and the single layer sheet-shaped gas adsorbent 10. The insulating body 30 is configured of: laminating the single layer sheet-shaped gas adsorbent 10 over the core member 31; coating the outer circumference thereof with the sheath member 32; and then depressurizing the interior of the sheath member 32. More specifically, the insulating body 30 according to the present embodiment is equivalent to a vacuum insulation member.

Any types of materials can be preferably employed for the core member 31 used in the insulating body 30, as long as having so large volume that a depressurized space can be formed in the inside of the insulating body 30. More specifically, the material typically includes, for example, a molded product having communicating voids (communicating void member) or a foam member, powder and granular material, a cohesion product or a molded product of the powder and granular material, a fiber material, a molded product of the fiber material, and a cloth body employing the fiber materials (nonwoven fabric, textile, braid and the like). These materials, may be employed alone as a core member 31, or a combination of two or more types may be employed.

In addition, specific material types of these materials (communicating void member, foam member, powder and granular material, fiber material and the like) are not particularly limited, and may be resin materials such as polystyrene, polyurethane and the like, and if it is fiber materials, may be plant-based fibers such as raw cotton, hemp and the like or may be inorganic materials such as carbon materials, glass materials and the like, and a suitable combination of two or more of these organic-based and/or inorganic-based materials may be employed. In the present embodiment, a molded product of the glass wool, which is an inorganic fiber, is employed as the core member 31.

If the material of the sheath member 32 employed for the insulating body 30 satisfies that it can be formed into a shape, which covers the core member 31 and the multiple-layered structure body of the single layer sheet-shaped gas adsorbent 10 and that it is the material that allows obstructing the gas penetration so as to maintain the state of depressurizing the inside thereof, or the material that has gas barrier ability, the type of the material is not particularly limited.

More specifically, for example: a gas barrier multiple-layered member, in which a metal foil (or a metallic thin layer) is laminated over metals such as aluminum or the alloy thereof and the like, various types of inorganic glasses, or various types of resin materials; or composite materials and the like, in which inorganic materials such as metals or inorganic glasses and the like and organic materials such as resins and the like are combined by a known technique; may be preferably employed. In addition, the specific shape of the sheath member 32 is not particularly limited, and may be a bag shape having a certain level of deformability, or may be a box-shaped container having reduced deformability, or may be the combination thereof. In the present embodiment, a product prepared by thermally welding a laminate film composed by laminating a surface protective layer, a gas barrier layer, and a thermally welded layer into a bag-shaped configuration is employed as the sheath member 32.

Here, the gas barrier ability required for the sheath member 32 may be preferably defined by a gas permeability of equal to or lower than $10^4$ $cm^3/m^2 \cdot day \cdot atm$, though it depends upon the conditions for using the insulating body 30 or the level of depressurizing the inside of the insulating body 30, and a gas permeability of equal to or lower than $10^3$ $cm^3/m^2 \cdot day \cdot atm$ is more preferable, and a gas permeability of equal to or lower than $10^2$ $cm^3/m^2 \cdot day \cdot atm$ is further preferable.

In addition to above, since the specific configuration of the single layer sheet-shaped gas adsorbent 10 is described in the aforementioned Embodiment 1, the duplicated description thereof is not presented in the present embodiment. In addition, the sheet-shaped gas adsorbent employed for the insulating body 30 is not limited to the single layer sheet-shaped gas adsorbent 10 as described in the aforementioned Embodiment 1, and may have a multiple-layered structure such as the triple-layered sheet-shaped gas adsorbent 20 as described in the aforementioned embodiment 2, or may have other configuration, which is contained within the scope of the sheet-shaped gas adsorbent according to the present invention. More specifically, it is only necessary to configure the sheet-shaped gas adsorbent employed for the insulating body 30 to contain at least the copper ion-exchanged ZSM-5 type zeolite 12 in the thermoplastic resin sheet 11, and further, other gas adsorbent, other additive and the like may be contained, or it may alternatively be configured to laminate various types of other layers.

While the process for producing the insulating body 30 is not particularly limited, an example of the typical production process will be specifically described. More specifically, in the present embodiment, a sheath member forming step, an interior loading step, a depressurizing step, and an encapsulating step are carried out to produce the insulating body 30.

In the sheath member forming step, as described above, a tetragon (for example, rectangular) laminate film, which is configured of laminating the surface protective layer, the gas barrier layer, and the thermally welded layer, is prepared, and two sheets of the laminate films are stacked and three sides of the stack are thermally welded to close the bag. This achieves the formation of the bag-shaped sheath member 32. In addition to above, a specific method of the thermal welding is not particularly limited, and a known method can be preferably employed.

In the next, in the interior loading step, the molded product of glass wool is employed for the core member 31 as described above, and the single layer sheet-shaped gas adsorbent 10 is laminated over this molded product to and the resultant product is inserted in the inside of the bag-shaped sheath member 32. This achieves the inside of the sheath member 32 loaded with the core member 31 and the single layer sheet-shaped gas adsorbent 10. In addition to above, in the interior loading step, the inside of the sheath member 32 may alternatively be loaded with materials except the core member 31 and the single layer sheet-shaped gas adsorbent 10.

Next, in the depressurizing step, a chamber connected to a vacuum pump is prepared, and the sheath member 32 loaded with the core member 31 and the like is disposed in this chamber, and the inside of the chamber is depressurized so as to reduce the pressure to, for example, about 10 Pa. This allows depressurizing the inside of the sheath member 32 to a pressure on the order of 10 Pa. In addition to above, the level of the depressurizing is suitably provided according to the performance required by the insulating body 30, and it is not intend to limit to 10 Pa.

Next, in the encapsulating step, the remaining one side of the sheath member 32 in the chamber in the opening state is sealed by the thermal welding. Since the sheath member 32 has gas barrier ability, the inside of the sheath member 32 is maintained at the depressurizing state after the sealing.

As described above, in the insulating body 30 according to the present embodiment, the single layer sheet-shaped gas adsorbent 10, together with the core member 31, are encapsulated in the inside of the sheath member 32. Hence, the adsorptive removal of the moisture, which has been adhered onto the inner surface of the core member 31 or the sheath member 32 and has not yet been completely removed therefrom by the vacuum pump, and the air remaining in the inside of the sheath member 32, are achieved with the single layer sheet-shaped gas adsorbent 10. Hence, the pressure in the inside of the insulating body 30 can be sufficiently reduced, and therefore such an insulating body 30 can exhibit enhanced thermal insulation performance and enhanced durability over time.

In addition, since the gas adsorbent is in the sheet-like form, this can be easily laminated over the core member 31, and in addition, this can be easily inserted in the inside of the insulating body 30 together with the core member 31. Hence, the gas adsorbent can be provided in the insulating body 30 with a simple process without deteriorating the appearance. Further, even if it is configured that the sheath member 32 has the gas barrier ability, it may be difficult to completely prevent the penetration of air and water vapor from the outside depending on the type of the sheath member 32, and on the other hand, the single layer sheet-shaped gas adsorbent 10 is provided in the inside of the sheath member 32, and therefore the adsorptive removal of the air and/or the moisture entered through the sheath member 32 as time advances can be achieved with the sheet-shaped gas adsorbent.

While the insulating body 30 is configured to comprise the core member 31, the sheath member 32 and the single layer sheet-shaped gas adsorbent 10 in the present embodiment, the present invention is not limited to this, and the inside of the sheath member 32 may alternatively be loaded with materials or members except the core member 31 and the single layer sheet-shaped gas adsorbent 10, or other materials or members may be provided over the outer circumference of the sheath member 32, or as described above, a sheet-shaped gas adsorbent except the single layer sheet-shaped gas adsorbent 10 may be included. More specifically, the configuration of the insulating body 30 according to the present invention is not limited as long as the core member 31, the sheath member 32, and the sheet-shaped gas adsorbent are included, and it is needless to mention that a member or the like, which is applicable as a constituent element of the vacuum insulation member or a known other insulating body, may be included.

Embodiment 4

Figure 4:
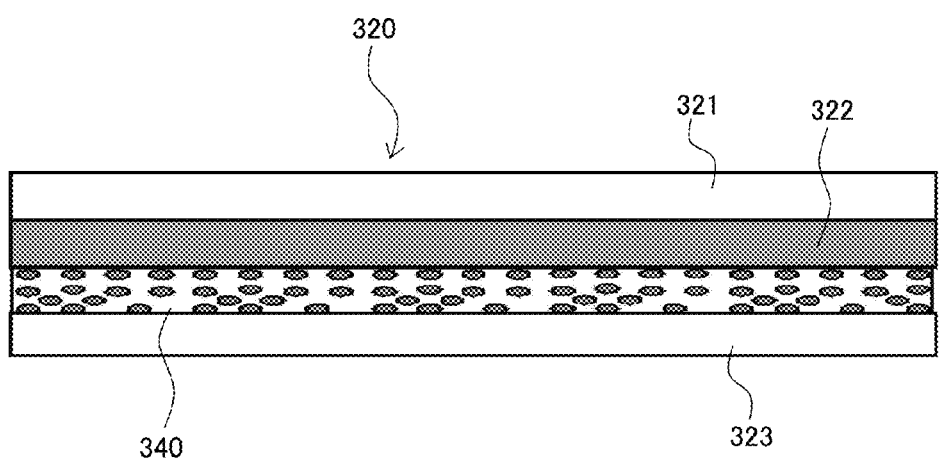
FIG. 4 is a cross-sectional view, illustrating an example of a configuration of a laminate film composed by an integration of a sheet-shaped gas adsorbent and a sheath member, employed in an insulating body according to Embodiment 4 of the present invention.

While the inside of the sheath member 32 is loaded with the core member 31 and the sheet-shaped gas adsorbent (single layer sheet-shaped gas adsorbent 10) in the insulating body 30 according to the aforementioned Embodiment 3, the present invention is not limited to such a configuration, and the sheath member 32 may also be applied to the sheet-shaped gas adsorbent. In the present Embodiment 4, an example of a configuration of a sheath member 32 including a sheet-shaped gas adsorbent will be specifically described in reference to FIG. 4. FIG. 4 is a cross-sectional view illustrating an example of a configuration of a laminate film serving as the sheath member 32 employed in an insulating body according to Embodiment 4 of the present invention.

As shown in FIG. 4, a laminate film 320, which is employed as the sheath member 32 in the present embodiment, comprises a surface protective layer 321, a gas barrier layer 322 and a thermally welded layer 323 similarly as in the sheath member 32 employed in the aforementioned Embodiment 3, and further comprises a gas adsorbent layer 340, which corresponds to the sheet-shaped gas adsorbent. More specifically, the laminate film 320 is a layered film having quaternary layered structure, in which, in sequence from the outside, the surface protective layer 321, the gas barrier layer 322, the gas adsorbent layer 340 and the thermally welded layer 323 are laminated by sequence.

A known protective member may be preferably employed for the surface protective layer 321 constituting the laminate film 320, as long as it leastwise provides a protection of the gas barrier layer 322 from various external influences and it preferably provides the protection for the whole laminate film 320. The present embodiment typically employs, for example, a resin film composed of a thermoplastic resin as a major constituent such as polyethylene film, polyethylene terephthalate film, nylon film and the like, though it is not particularly limited. The use of such a resin film allows effectively restraining a generation of a defect such as a scratch, a crack, a breakage and the like in the gas barrier layer 322, even if it is assumed that an external force, for example, is applied over the laminate film 320.

In addition to above, depending upon the level of the protection over the gas barrier layer 322 (or laminate film 320), a film having further enhanced surface strength may be selected to be employed as the surface protective layer 321. Inversely, if a certain level of protective can be achieved even though surface strength is lower, a film of lower cost can be alternatively selected to achieve the reduction of the cost.

A known product may be preferably employed for the gas barrier layer 322 constituting the laminate film 320, as long as this employs a material, which allows inhibiting a permeation of a gas from the outside toward the inside. The typical product in the present embodiment includes, for example, various types of metal foils such as an aluminum foil and the like, and metal vapor deposition films such as aluminum deposition film and the like, though it is not particularly limited.

A known product may be preferably employed for the thermally welded layer 323 constituting the laminate film 320, as long as this is composed of a material that can be welded by heating to be adhered. In particular, since the respective sides of the rectangular member composed by stacking the laminate film 320 are thermally welded to form the sheath member 32 in the present embodiment similarly as described in the aforementioned Embodiment 3, the thermally welded layer 323 may be composed of a material, which is capable of mutually melting by heating in the state of opposing each other to provide a heat sealing. More specifically, a thermoplastic film such as a polyethylene film may be preferably employed, though it is not particularly limited.

The gas adsorbent layer 340 constituting the laminate film 320 in the present embodiment is configured similarly as in the single layer sheet-shaped gas adsorbent 10 described in the aforementioned Embodiment 1, and thus the duplicated description thereof is not presented. In addition to above, it is needless to mention that the specific configuration of the gas adsorbent layer 340 is not particularly limited, as long as it is constituted of a sheet-shaped gas adsorbent containing the copper ion-exchanged ZSM-5 type zeolite 12 that is capable of adsorbing air.

Since the laminate film 320 unified with the sheet-shaped gas adsorbent is employed in the sheath member 32 in the present embodiment as described above, the step for applying the sheet-shaped gas adsorbent in the production of the insulating body 30 (the step of laminating the sheet-shaped gas adsorbent over the core member 31 in the interior loading step in the aforementioned Embodiment 3) can be omitted. In addition, this provides the sheath member 32 itself comprising the sheet-shaped gas adsorbent, so that the insulating body 30 exhibiting enhanced thermal insulation performance and enhanced durability over time can be provided, even if none of the single layer sheet-shaped gas adsorbent 10 is additionally inserted in the interior thereof.

Further, since the laminate film 320 in the present embodiment is configured such that the gas adsorbent layer 340 serving as the sheet-shaped gas adsorbent is retained between the gas barrier layer 322 and the thermally welded layer 323, such a configuration leads to the constitution similar to the triple-layered sheet-shaped gas adsorbent 20 according to the aforementioned Embodiment 2, in which the gas barrier layer 322 and the thermally welded layer 323 cover the sheet-shaped gas adsorbent (gas adsorbent layer 340). Hence, the possibility of deterioration of the adsorbing ability of the gas adsorbent layer 340 by approaching to the saturated state due to the adsorption of larger amount of moisture and/or air before the practical use (by the point in time when the insulating body 30 in the state of depressurizing the inside thereof is produced) can be effectively inhibited.

EXAMPLES

While the present invention will be more specifically described on the basis of Examples and Comparative Examples, the present invention is not limited thereto. It is apparent that the present invention may be modified, corrected and changed by a person having ordinary skills in the art without departing from the scope and the spirit of the present invention.

(Evaluation Method)

Concerning the sheet-shaped gas adsorbent, respective evaluations for appearance, moisture adsorption property, adsorption property for nitrogen as a representative of air component, tensile strength, and thickness available for the production of the sheet-shaped gas adsorbent were conducted in the following Examples and Comparative Examples. Also, concerning the insulating body, respective evaluations for appearance, internal pressure, and thermal conductivity were conducted. Specific evaluation methods will be subsequently described.

[Appearance of Sheet-Shaped Gas Adsorbent]

Concerning the appearance of the sheet-shaped gas adsorbent, a presence of a generation of a crack, a cleavage and the like, and a discoloration in the sheet-shaped gas adsorbent obtained in the respective Examples or Comparative Examples were evaluated by visual inspections.

[Moisture Absorption Property of Sheet-Shaped Gas Adsorbent]

The moisture adsorption property of the sheet-shaped gas adsorbent was evaluated by measuring the amount of the absorbed moisture per 1 g at 25 degrees C. under a predetermined pressure condition employing Autosorb 1-C (commercially available from Quantachrome Instruments), which can measure the volume adsorbed gas. Here, the pressure conditions of 3,000 Pa, which is the maximum vapor-pressure at 25 degrees C., and in particular 10 Pa for the purpose of comparing with the amount of the moisture absorbed at the lower partial pressure, were employed.

The measuring methods for the amount of the gas adsorption, which was adsorbed by the sheet-shaped gas adsorbent, and gas absorption capacity of the sheet-shaped gas adsorbent were as follows.

First of all, the weight of the sheet-shaped gas adsorbent employing in the evaluation was weighed to provide an evaluation sample, and the evaluation sample was inserted in a sample tube of a known volume. In the next, the sample tube was connected to a manifold of a known volume through an open-shut section (cock). Then, the temperature adjustment was carried out so that the temperature of the aforementioned manifold and the temperature of the aforementioned sample tube are all equivalent to the measuring temperature. Since the measuring temperature was defined at 25 degrees C. in the following Examples and the Comparative Examples, the manifold was placed in a thermostatic chamber, and the sample tube was placed in a constant temperature water bath to adjust the temperature at a constant level.

Next, the insides of the aforementioned manifold and the aforementioned sample tube were vacuumed, while maintaining the state that the aforementioned open-shut section was opened. Hereafter, the aforementioned open-shut section was shut to introduce an adsorbing object gas of a predetermined volume (water vapor or nitrogen) into the aforementioned manifold. Here, the amount of this introduction was an amount for providing a predetermined pressure when the aforementioned open-shut section was opened to conduct the above-described operation in the state that the evaluation sample was not inserted in the sample tube. For example, when the amount of the absorbed gas under the pressure condition of 10 Pa was measured, the gas was introduced in the aforementioned manifold until the pressure therein was slightly larger than 10 Pa, based on the volumes of the aforementioned manifold and the aforementioned sample tube.

The aforementioned open-shut section was opened in the state that the gas to be adsorbed was already introduced to introduce the gas to be adsorbed from the aforementioned manifold to the aforementioned sample tube, and the pressure in the aforementioned manifold was measured after a predetermined time had passed. Then, the amount of the gas adsorbed by the aforementioned evaluation sample was calculated by employing the pressure drop at this time. In addition, this was further divided by the weight of the evaluation sample, which was previously measured, to calculate the adsorption capacity of the evaluation sample (sheet-shaped gas adsorbent) [unit: mL (milliliter)/g].

In addition to above, in the following respective Examples and Comparative Examples, it is assumed that the amount of the gas to be adsorbed, which was actually adsorbed by the evaluation sample, is provided by volume in the standard state of 25 degrees C. and 1 atmosphere.

[Nitrogen Adsorption Property of the Sheet-Shaped Gas Adsorbent]

The nitrogen adsorption property of the sheet-shaped gas adsorbent was also evaluated by measuring the amount of the absorbed nitrogen per 1 g at 25 degrees C. under a predetermined pressure condition employing Autosorb 1-C (commercially available from Quantachrome Instruments), similarly as in the measurement of the aforementioned moisture adsorption property. Here, the pressure conditions of 80,000 Pa, which resembles the partial pressure of nitrogen in the air, and in particular 10 Pa for the purpose of comparing with the amount of the nitrogen absorbed at the lower partial pressure, were employed. Also, the measuring methods for the amount of the gas adsorption, which was adsorbed by the sheet-shaped gas adsorbent, and gas absorption capacity of the sheet-shaped gas adsorbent were similar as described above, and therefore the duplicated descriptions thereof were not presented.

[Tensile Strength of Sheet-Shaped Gas Adsorbent]

The tensile strength of the sheet-shaped gas adsorbent was evaluated by measuring the tensile strength according to JIS-K7127 by employing AUTOGRAPH universal tester of Shimazu Corporation.

[Thickness Available for Production of Sheet-Shaped Gas Adsorbent]

The thickness available for the production of the sheet-shaped gas adsorbent was evaluated in the following procedures. First of all, when the sheet-shaped gas adsorbent was produced, the production was at first started at the condition of the sheet thickness of 300 µm. Then, the sheet thickness was gradually reduced while confirming the generation of a breakage and/or a cleavage by visual inspection, and the sheet thickness nearest preceding the generation of a breakage and/or a cleavage was defined as the thickness available for the production of the sheet. Here, the sheet thickness was measured with Super Caliper manufactured by Mitutoyo Corporation.

In the following Examples and Comparative Examples, the production was continued until the thickness of the sheet-shaped gas adsorbent was reduced to 10 µm. Therefore, when the obtained result was 10 µm, the thickness available for the production of the sheet-shaped gas adsorbent was evaluated as that further reduction of the thickness was possible.

[Appearance of Insulating Body]

The appearance of the insulating body was evaluated on the flatness of the surface by conducting a visual inspection for the surface of the insulating body as the evaluation object.

[Internal Pressure of Insulating Body]

The internal pressure of the sheath member of the insulating body was evaluated by measuring with a spinning rotor gauge commercially available from SAES Getters Japan Co. Ltd. More specifically, a sensor head of the spinning rotor gauge was installed on a portion of the sheath member in advance. Then, in order to restrain an air penetration from the installation location of the sensor head, the installation location was sealed with the dedicated resin, and after that, the internal pressure was measured. Here, the evaluation of the internal pressure was achieved by the measurement after the storage in a constant-temperature oven of 70 degrees C. for 4 hours after the production the insulating body.

[Thermal Conductivity of Insulating Body]

The thermal conductivity of the insulating body was evaluated by conducting measurements according to JIS-A1412 with a thermal conductivity tester Auto Lambda 074, manufactured by EKO Instruments Co., Ltd. In addition to above, the evaluation of the thermal conductivity was also achieved by the measurement after the storage in a constant-temperature oven of 70 degrees C. for 4 hours after the production the insulating body, similarly as in the evaluation of the internal pressure.

TABLE 1

| | | | EXAMPLE 1 | EXAMPLE 2 | EXAMPLE 3 | EXAMPLE 4 | EXAMPLE 5 | EXAMPLE 6 |
|---|---|---|---|---|---|---|---|---|
| PRODUCTION CONDITIONS | THERMOPLASTIC RESINS | TYPE | HDPE | HDPE | HDPE | HDPE | HDPE | HDPE |
| | | SOFTENING POINT [° C.] | 130 | 130 | 130 | 130 | 130 | 130 |
| | | RESIN TEMPERATURE DURING FORMING [° C.] | 190 | 190 | 190 | 200 | 220 | 190 |
| | GAS ADSORBING | TYPE | COPPER ION-EXCHANGED ZSM-5 TYPE | COPPER ION-EXCHANGED ZSM-5 TYPE | COPPER ION-EXCHANGED ZSM-5 TYPE | COPPER ION-EXCHANGED ZSM-5 TYPE | COPPER ION-EXCHANGED ZSM-5 TYPE | COPPER ION-EXCHANGED ZSM-5 TYPE |

TABLE 1-continued

|  |  | EXAMPLE 1 | EXAMPLE 2 | EXAMPLE 3 | EXAMPLE 4 | EXAMPLE 5 | EXAMPLE 6 |
|---|---|---|---|---|---|---|---|
| COMPONENT | BLENDING QUALITY (OVER 100 PBW OF THERMOPLASTIC RESIN) | ZEOLITE 20 | ZEOLITE 40 | ZEOLITE 42 | ZEOLITE 20 | ZEOLITE 20 | ZEOLITE 40 |
|  | PRETREATMENT DONE/NOT IF DONE, ITS CONDITION | NOT | NOT | NOT | NOT | NOT | THERMAL DRYING 200° C., 4 HOURS |
| EVALUATION RESULTS | APPEARANCE | GOOD | GOOD | CLEAVAGE | DISCOLORATION | DISCOLORATION, CRACK | GOOD |
|  | AMOUNT OF ABSORBED MOISTURE (3,000 Pa) [mL/g] | 22 | 45 | 30 | 17 | 12 | 62 |
|  | AMOUNT OF ABSORBED MOISTURE (10 Pa) [mL/g] | 0.1 | 0.3 | 0 | 0 | 0 | 1 |
|  | AMOUNT OF ABSORBED NITROGEN (80,000 Pa) [mL/g] | 0 | 1 | 0 | 0 | 0 | 2.1 |
|  | AMOUNT OF ABSORBED NITROGEN (10 Pa) [mL/g] | 0 | 0.1 | 0 | 0 | 0 | 0.3 |
|  | TENSILE STRENGTH [MPa] | 30.2 | 32.2 | 30.8 | 50 | 34.5 | 33 |
|  | THICKNESS AVAILABLE FOR PRODUCTION [μm] | 10 | 10 | 123 | 150 | 180 | 10 |

Example 1

High density polyethylene (HDPE) having a softening point of 130 degrees C. was employed as the thermoplastic resin. Then, the copper ion-exchanged ZSM-5 type zeolite was blended so as to adjust 20 parts by weight (pbw) over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature during the forming) was 190 degrees C. The results of the evaluations for the obtained sheet-shaped gas adsorbent of the present Example is shown in Table 1.

As shown in Table 1, good appearance without particular generation of a crack, a cleavage or the like in the sheet and without finding a discoloration was achieved. The resultant amount of absorbed moisture was: 22 mL/g at 3,000 Pa; and 0.1 mL/g at 10 Pa. In addition, the resultant amount of absorbed nitrogen was 0 mL/g for both conditions of 80,000 Pa and 10 Pa. The resultant tensile strength was 30.2 MPa, and the resultant thickness available for the production of the sheet was 10 μm.

In the present Example, 20 pbw of the copper ion-exchanged ZSM-5 type zeolite was blended as the gas adsorbing component. On the contrary, in Comparative Example 1 as will be discussed later, 20 pbw of copper ion-exchanged X-type zeolite was blended as the gas adsorbing component (see Table 2), and in Comparative Example 3, commercially available calcium oxide (marketed product), which serves as a general-purpose moisture adsorbent, was employed as the gas adsorbing component. It was clarified that the sheet-shaped gas adsorbent of the present Example exhibited enhanced amount of absorbed moisture, as compared with the comparative sheet-shaped gas adsorbent of Comparative Example 1 or with the gas adsorbent of Comparative Example 3.

Also, since the blending quantity of the copper ion-exchanged ZSM-5 type zeolite over the thermoplastic resin was equal to or lower than 40 pbw, the sheet-shaped gas adsorbent having improved strength was obtained without generating a crack, a cleavage or the like in the sheet-shaped gas adsorbent.

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged ZSM-5 type zeolite (generation of copper corrosion) was sufficiently inhibited. Hence, the sheet-shaped gas adsorbent having sufficient strength was able to be easily produced.

As described above, in the present Example 1, the sheet-shaped gas adsorbent, which was capable of adsorbing moisture within a range of the ambient temperature and under low partial pressure with large capacitance, was able to be produced. In addition, the blending quantity of the copper ion-exchanged ZSM-5 type zeolite over the thermoplastic resin and the temperature of the thermoplastic resin in thermal forming process were suitably limited to allow inhibiting a generation of a crack, a cleavage, a discoloration or the like in the sheet-shaped gas adsorbent, and presenting the thickness available for the production of the sheet as being equal to or smaller than 10 μm.

Example 2

High density polyethylene (HDPE) having a softening point of 130 degrees C. was employed as the thermoplastic resin. Then, the copper ion-exchanged ZSM-5 type zeolite was blended so as to adjust 40 pbw over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature during the forming) was 190 degrees C. The results of the evaluations for the obtained sheet-shaped gas adsorbent of the present Example is shown in Table 1.

As shown in Table 1, good appearance without particular generation of a crack, a cleavage or the like in the sheet and without finding a discoloration was achieved. The resultant amount of absorbed moisture was: 45 mL/g at 3,000 Pa; and 0.3 mL/g at 10 Pa. In addition, the resultant amount of absorbed nitrogen was: 1 mL/g at 80,000 Pa; and 0.1 mL/g at 10 Pa. The resultant tensile strength was 32.2 MPa, and the resultant thickness available for the production of the sheet was 10 μm.

In the present Example, 20 pbw of the copper ion-exchanged ZSM-5 type zeolite was blended as the gas adsorbing component. Hence, it was clarified that the sheet-shaped gas adsorbent of the present Example exhibited enhanced amount of absorbed moisture, as compared with the comparative sheet-shaped gas adsorbent of Comparative Example 2 (see Table 2) or with the gas adsorbent of Comparative Example 3 (see Table 2).

Also, since the blending quantity of the copper ion-exchanged ZSM-5 type zeolite over the thermoplastic resin was equal to or lower than 40 pbw, the sheet-shaped gas adsorbent having improved strength was obtained without generating a crack, a cleavage or the like in the sheet-shaped gas adsorbent.

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged ZSM-5 type zeolite (generation of copper corrosion) was sufficiently inhibited. Hence, the sheet-shaped gas adsorbent having sufficient strength was able to be easily produced.

As described above, in the present Example 2, the sheet-shaped gas adsorbent, which was capable of adsorbing moisture within a range of the ambient temperature and under low partial pressure with large capacitance, was able to be produced. In addition, the blending quantity of the copper ion-exchanged ZSM-5 type zeolite over the thermoplastic resin and the temperature of the thermoplastic resin in thermal forming process were suitably limited to allow inhibiting a generation of a crack, a cleavage, a discoloration or the like in the sheet-shaped gas adsorbent, and presenting the thickness available for the production of the sheet as being equal to or smaller than 10 μm.

Example 3

High density polyethylene (HDPE) having a softening point of 130 degrees C. was employed as the thermoplastic resin. Then, the copper ion-exchanged ZSM-5 type zeolite was blended so as to adjust 42 pbw over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature during the forming) was 190 degrees C. The results of the evaluations for the obtained sheet-shaped gas adsorbent of the present Example is shown in Table 1.

As shown in Table 1, concerning the appearance, a generation of a cleavage was confirmed in a portion of the sheet-shaped gas adsorbent. The resultant amount of absorbed moisture was: 30 mL/g at 3,000 Pa; and 0 mL/g at 10 Pa. In addition, the resultant amount of absorbed nitrogen was 0 mL/g for both conditions of 80,000 Pa and 10 Pa. The thickness available for the production of the sheet was 123 μm shortly before a cleavage was generated in a portion of the sheet-shaped gas adsorbent, and although the sheet thickness was 123 μm, which was thicker as compared with the sheet-shaped gas adsorbents of Examples 1 and 2, the tensile strength was 30.8 MPa, which was substantially equivalent thereto.

In the present Example, 42 pbw of the copper ion-exchanged ZSM-5 type zeolite was blended as the gas adsorbing component. Hence, it was clarified that the sheet-shaped gas adsorbent of the present Example exhibited enhanced amount of absorbed moisture, as compared with the comparative sheet-shaped gas adsorbent of Comparative Example 2 (see Table 2) or with the gas adsorbent of Comparative Example 3 (see Table 2).

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged ZSM-5 type zeolite (generation of copper corrosion) was sufficiently inhibited. Hence, the sheet-shaped gas adsorbent having sufficient strength was able to be easily produced.

However, since the blending quantity of the copper ion-exchanged ZSM-5 type zeolite for thermoplastic resin was higher than 40 pbw, a cleavage was generated in a portion of the sheet-shaped gas adsorbent. Thus, the thickness available for the production of the sheet was 123 μm, which is thicker as compared with the sheet-shaped gas adsorbents of Examples 1 and 2, and further reduction of the thickness was difficult.

Also, although the thickness available for the production of the sheet was thicker as compared with the sheet-shaped gas adsorbents of Examples 1 and 2, the tensile strength was equivalent thereto. It is considered that this is because the excessive blending quantity of the copper ion-exchanged ZSM-5 type zeolite presumably deteriorates the relative strength of the resin.

As described above, in the present Example 3, the sheet-shaped gas adsorbent, which was capable of adsorbing moisture within a range of the ambient temperature and under low partial pressure with large capacitance, was able to be produced. However, if the blending quantity of the copper ion-exchanged ZSM-5 type zeolite for thermoplastic resin is higher than 40 pbw, a cleavage may be possibly generated in a portion of the sheet-shaped gas adsorbent. Hence, it was found that the blending quantity of the copper ion-exchanged ZSM-5 type zeolite is preferably equal to or lower than 40 pbw, if the application is to place importance on the strength and the appearance.

Example 4

High density polyethylene (HDPE) having a softening point of 130 degrees C. was employed as the thermoplastic resin. Then, the copper ion-exchanged ZSM-5 type zeolite was blended so as to adjust 20 pbw over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature during the forming) was 200 degrees C. The results of the evaluations for the obtained sheet-shaped gas adsorbent of the present Example is shown in Table 1.

As shown in Table 1, concerning the appearance, a dark brown discoloration was confirmed in the sheet-shaped gas adsorbent. The resultant amount of absorbed moisture was: 17 mL/g at 3,000 Pa; and 0 mL/g at 10 Pa. In addition, the resultant amount of absorbed nitrogen was 0 mL/g for both conditions of 80,000 Pa and 10 Pa. The resultant tensile strength was 50.2 MPa, and the resultant thickness available for the production of the sheet was 150 μm.

In the present Example, 20 pbw of the copper ion-exchanged ZSM-5 type zeolite was blended as the gas adsorbing component. Hence, it was clarified that the sheet-shaped gas adsorbent of the present Example exhibited enhanced amount of absorbed moisture, as compared with the comparative sheet-shaped gas adsorbent of Comparative Example 1 (see Table 2) or with the gas adsorbent of Comparative Example 3 (see Table 2).

However, the heating temperature of the high density polyethylene during the extrusion process was 200 degrees C., which is higher than the heating upper limit temperature (190 degrees C. that is higher than the softening point, 130 degrees C., of the high density polyethylene by 60 degrees C.). Hence, a copper corrosion was generated in the high density polyethylene due to copper ion contained in the copper ion-exchanged ZSM-5 type zeolite, which resulted in a generation of a discoloration in the sheet-shaped gas adsorbent.

Also, since an embrittlement of the high density polyethylene was generated, which was presumably derived from the copper corrosion, excessive reduction of the sheet thickness induced the generations of cracks, cleavages, and the like. Hence, the thickness available for the production of the sheet was 150 µm, which is thicker as compared with the sheet-shaped gas adsorbents of Examples 1 and 2, and further reduction of the thickness was difficult. In addition, although the thickness available for the production of the sheet was thicker as compared with the sheet-shaped gas adsorbents of Examples 1 and 2, the width of the increase in the tensile strength was small. Hence, it was considered that the relative strength of the resin was deteriorated, as compared with the sheet-shaped gas adsorbents of Examples 1 and 2.

As described above, in the present Example 4, the sheet-shaped gas adsorbent, which was capable of adsorbing moisture within a range of the ambient temperature and under low partial pressure with large capacitance, was able to be produced. However, if the heating temperature of the thermoplastic resin during the extrusion process (resin temperature during the forming) was higher than the heating upper limit temperature, there was a concern that a discoloration was caused in the obtained sheet-shaped gas adsorbent. Hence, it was found that the resin temperature during the forming was equal to or lower than the heating upper limit temperature, namely a temperature of higher than the softening point of the thermoplastic resin by 60 degrees C., if the application is to place importance on the appearance.

Example 5

High density polyethylene (HDPE) having a softening point of 130 degrees C. was employed as the thermoplastic resin. Then, the copper ion-exchanged ZSM-5 type zeolite was blended so as to adjust 20 pbw over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature in the forming) was 220 degrees C. The results of the evaluations for the obtained sheet-shaped gas adsorbent of the present Example is shown in Table 1.

As shown in table 1, concerning the appearance, a rich dark brown discoloration was confirmed in the sheet-shaped gas adsorbent, and further a crack was also confirmed. The resultant amount of absorbed moisture was: 12 mL/g at 3,000 Pa; and 0 mL/g at 10 Pa. In addition, the resultant amount of absorbed nitrogen was 0 mL/g for both conditions of 80,000 Pa and 10 Pa. The resultant tensile strength was 34.5 MPa, and the resultant thickness available for the production of the sheet was 180 µm.

In the present Example, 20 pbw of the copper ion-exchanged ZSM-5 type zeolite was blended as the gas adsorbing component. Hence, it was clarified that the sheet-shaped gas adsorbent of the present Example exhibited enhanced amount of absorbed moisture, as compared with the comparative sheet-shaped gas adsorbent of Comparative Example 1 (see Table 2) or with the gas adsorbent of Comparative Example 3 (see Table 2).

However, the heating temperature of the high density polyethylene during the extrusion process was 220 degrees C., which is higher than the heating upper limit temperature (190 degrees C. that is higher than the softening point, 130 degrees C., of the high density polyethylene by 60 degrees C.), and was also higher than 200 degrees C. of Example 4. Hence, a copper corrosion, which was stronger than the sheet-shaped gas adsorbent of Example 4, was generated in the high density polyethylene due to copper ion contained in the copper ion-exchanged ZSM-5 type zeolite, which resulted in generations of not only a discoloration, but also a crack, in the sheet-shaped gas adsorbent.

Also, since an embrittlement of the high density polyethylene was generated, which was presumably derived from the copper corrosion, excessive reduction of the sheet thickness induced the generations of cracks, cleavages, and the like. Hence, the thickness available for the production of the sheet was 180 µm, which is further thicker as compared with the sheet-shaped gas adsorbent of Example 4, and further reduction of the thickness was difficult.

As described above, in the present Example 5, the sheet-shaped gas adsorbent, which was capable of adsorbing moisture within a range of the ambient temperature and under low partial pressure with large capacitance, was able to be produced. However, if the heating temperature of the thermoplastic resin during the extrusion process (resin temperature during the forming) was excessively higher than the heating upper limit temperature, there was a concern that not only a discoloration but also a crack were caused in the obtained sheet-shaped gas adsorbent. Hence, it was found that the resin temperature during the forming was equal to or lower than the heating upper limit temperature, namely a temperature of higher than the softening point of the thermoplastic resin by 60 degrees C., if the application is to place importance on the appearance.

Example 6

High density polyethylene (HDPE) having a softening point of 130 degrees C. was employed as the thermoplastic resin. Then, the copper ion-exchanged ZSM-5 type zeolite was blended so as to adjust 40 pbw over 100 pbw of the high density polyethylene, and the sheet-shaped gas adsorbent was extruded with an extruder. In addition to above, a thermal drying processing at 200 degrees C. for 4 hours was conducted for the copper ion-exchanged ZSM-5 type zeolite in advance. In addition, the heating temperature in the extrusion process (resin temperature during the forming) was 190 degrees C. The results of the evaluations for the obtained sheet-shaped gas adsorbent of the present Example is shown in Table 1.

As shown in Table 1, good appearance without particular generation of a crack, a cleavage or the like in the sheet-shaped gas adsorbent and without finding a discoloration was achieved. The resultant amount of absorbed moisture was: 62 mL/g at 3,000 Pa; and 1.0 mL/g at 10 Pa. In addition, the resultant amount of absorbed nitrogen was: 2.1 mL/g at 80,000 Pa; and 0.3 mL/g at 10 Pa. The resultant tensile strength was 33.0 MPa, and the resultant thickness available for the production of the sheet was 10 μm.

In the present Example, 20 pbw of the copper ion-exchanged ZSM-5 type zeolite was blended as the gas adsorbing component. Hence, it was clarified that the sheet-shaped gas adsorbent of the present Example exhibited particularly enhanced amount of absorbed moisture, as compared with the comparative sheet-shaped gas adsorbent of Comparative Example 2 (see Table 2) or with the gas adsorbent of Comparative Example 3 (see Table 2).

It was also found that the amount of absorbed moisture in the sheet-shaped gas adsorbent of the present Example, in which the pretreatment was conducted for the copper ion-exchanged ZSM-5 type zeolite, was further increased, as compared with the sheet-shaped gas adsorbent of Example 2, which contains the copper ion-exchanged ZSM-5 type zeolite with the equivalent blending quantity. It is considered that this was caused because the thermal processing at 200 degrees C.

ZSM-5 type zeolite (generation of copper corrosion) was sufficiently inhibited. Hence, the sheet-shaped gas adsorbent having sufficient strength was able to be easily produced.

As described above, in the present Example 6, the sheet-shaped gas adsorbent, which was capable of adsorbing moisture within a range of the ambient temperature and under low partial pressure with large capacitance, was able to be produced. In addition, the blending quantity of the copper ion-exchanged ZSM-5 type zeolite over the thermoplastic resin and the temperature of the thermoplastic resin in thermal forming process were suitably limited and further the thermal drying processing was conducted for the copper ion-exchanged ZSM-5 type zeolite as the pretreatment to allow inhibiting a generation of a crack, a cleavage, a discoloration or the like in the sheet-shaped gas adsorbent, and presenting the thickness available for the production of the sheet as being equal to or smaller than 10 μm.

TABLE 2

| | | | EXAMPLE 7 | EXAMPLE 8 | EXAMPLE 9 | COMPARATIVE EXAMPLE 1 | COMPARATIVE EXAMPLE 2 | COMPARATIVE EXAMPLE 3 |
|---|---|---|---|---|---|---|---|---|
| PRODUCTION CONDITIONS | THERMOPLASTIC RESINS | TYPE | HDPE | PP | Ny | HDPE | HDPE | — |
| | | SOFTENING POINT [° C.] | 130 | 160 | 225 | 130 | 130 | — |
| | | RESIN TEMPERATURE DURING FORMING [° C.] | 190 | 200 | 250 | 190 | 190 | — |
| | GAS ADSORBING COMPONENT | TYPE | COPPER ION-EXCHANGED ZSM-5 TYPE ZEOLITE | COPPER ION-EXCHANGED ZSM-5 TYPE ZEOLITE | COPPER ION-EXCHANGED ZSM-5 TYPE ZEOLITE | COPPER ION-EXCHANGED X-TYPE ZEOLITE | COPPER ION-EXCHANGED X-TYPE ZEOLITE | CALCIUM OXIDE |
| | | BLENDING QUALITY (OVER 100 PBW OF THERMOPLASTIC RESIN) | 40 | 40 | 40 | 20 | 40 | — |
| | | PRETREATMENT DONE/NOT IF DONE, ITS CONDITION | VACUUM THERMAL PROCESSING, 600° C., 4 HOURS | VACUUM THERMAL PROCESSING, 600° C., 4 HOURS | VACUUM THERMAL PROCESSING, 600° C., 4 HOURS | NOT | VACUUM THERMAL PROCESSING, 600° C., 4 HOURS | — |
| EVALUATION RESULTS | APPEARANCE | | GOOD | GOOD | GOOD | GOOD | GOOD | — |
| | AMOUNT OF ABSORBED MOISTURE (3,000 Pa) [mL/g] | | 80 | 82 | 81 | 11 | 23 | 10.8 |
| | AMOUNT OF ABSORBED MOISTURE (10 Pa) [mL/g] | | 2.5 | 2.7 | 2.8 | 0 | 0 | 0.1 |
| | AMOUNT OF ABSORBED NITROGEN (80,000 Pa) [mL/g] | | 10.9 | 10.5 | 10.8 | 0 | 0 | — |
| | AMOUNT OF ABSORBED NITROGEN (10 Pa) [mL/g] | | 1 | 1.1 | 1.1 | 0 | 0 | — |
| | TENSILE STRENGTH [MPa] | | 33.1 | 100 | 180 | 29 | 28.4 | — |
| | THICKNESS AVAILABLE FOR PRODUCTION [μm] | | 10 | 10 | 10 | 10 | 10 | — | for 4 hours was conducted as the pretreatment to induce the elimination of the moisture previously contained in the copper ion-exchanged ZSM-5 type zeolite, which allowed further larger volume of the moisture adsorption. In addition, it was also found that a nitrogen adsorptive performance was exhibited by the pretreatment.

Also, since the blending quantity of the copper ion-exchanged ZSM-5 type zeolite over the thermoplastic resin was equal to or lower than 40 pbw, the sheet-shaped gas adsorbent having improved strength was obtained without generating a crack, a cleavage or the like in the sheet-shaped gas adsorbent.

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged Example 7

High density polyethylene (HDPE) having a softening point of 130 degrees C. was employed as the thermoplastic resin. Then, the copper ion-exchanged ZSM-5 type zeolite was blended so as to adjust 40 pbw over 100 pbw of the high density polyethylene, and the sheet-shaped gas adsorbent was extruded with an extruder. In addition to above, a vacuum thermal processing at 600 degrees C. for 4 hours was conducted for the copper ion-exchanged ZSM-5 type zeolite in advance. In addition, the heating temperature in the extrusion process (resin temperature during the forming) was 190 degrees C. The results of the evaluations for the obtained sheet-shaped gas adsorbent of the present Example is shown in Table 2.

As shown in Table 2, good appearance without particular generation of a crack, a cleavage or the like in the sheet-shaped gas adsorbent and without finding a discoloration was achieved. The resultant amount of absorbed moisture was: 80 mL/g at 3,000 Pa; and 2.5 mL/g at 10 Pa. In addition, the resultant amount of absorbed nitrogen was: 10.9 mL/g at 80,000 Pa; and 1.0 mL/g at 10 Pa. The resultant tensile strength was 33.1 MPa, and the resultant thickness available for the production of the sheet was 10 μm.

In the present Example, 40 pbw of the copper ion-exchanged ZSM-5 type zeolite was blended as the gas adsorbing component. Hence, it was clarified that the sheet-shaped gas adsorbent of the present Example exhibited particularly enhanced amount of absorbed moisture, as compared with the comparative sheet-shaped gas adsorbent of Comparative Example 2 or with the gas adsorbent of Comparative Example 3.

Also, it was found that the amount of absorbed moisture in the sheet-shaped gas adsorbent of the present Example, in which the pretreatment was conducted for the copper ion-exchanged ZSM-5 type zeolite, was further increased, as compared with the sheet-shaped gas adsorbent of Example 6, in addition to compared with the sheet-shaped gas adsorbent of Example 2, which contains the copper ion-exchanged ZSM-5 type zeolite with the equivalent blending quantity. It is considered that the vacuum thermal processing was conducted for the copper ion-exchanged ZSM-5 type zeolite as the pretreatment to allow eliminating the moisture, which had been previously contained in the copper ion-exchanged ZSM-5 type zeolite eliminate, and inducing the reduction of $Cu^{2+}$ contained in the copper ion-exchanged ZSM-5 type zeolite 12 into $Cu^+$. Hence, it was found that more enhanced moisture adsorptive performance was able to be exhibited, and similarly, improved nitrogen adsorptive performance was also exhibited.

Also, since the blending quantity of the copper ion-exchanged ZSM-5 type zeolite over the thermoplastic resin was equal to or lower than 40 pbw, the sheet-shaped gas adsorbent having improved strength was obtained without generating a crack, a cleavage or the like in the sheet-shaped gas adsorbent.

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged ZSM-5 type zeolite (generation of copper corrosion) was sufficiently inhibited. Hence, the sheet-shaped gas adsorbent having sufficient strength was able to be easily produced.

As described above, in the present Example 7, the sheet-shaped gas adsorbent, which was capable of adsorbing moisture within a range of the ambient temperature and under low partial pressure with large capacitance, was able to be produced. In addition, the blending quantity of the copper ion-exchanged ZSM-5 type zeolite over the thermoplastic resin and the temperature of the thermoplastic resin in thermal forming process were suitably limited, and further, the vacuum thermal processing was conducted for the copper ion-exchanged ZSM-5 type zeolite as the pretreatment, to allow inhibiting a generation of a crack, a cleavage, a discoloration or the like in the sheet-shaped gas adsorbent, and to present the thickness available for the production of the sheet as being equal to or smaller than 10 μm.

Example 8

Polypropylene (PP) having a softening point of 160 degrees C. was employed as the thermoplastic resin. Then, the copper ion-exchanged ZSM-5 type zeolite was blended so as to adjust 40 pbw over 100 pbw of the polypropylene, and the sheet-shaped gas adsorbent was extruded with an extruder. In addition to above, a vacuum thermal processing at 600 degrees C. for 4 hours was conducted for the copper ion-exchanged ZSM-5 type zeolite in advance. In addition, the heating temperature in the extrusion process (resin temperature during the forming) was 200 degrees C. The results of the evaluations for the obtained sheet-shaped gas adsorbent of the present Example is shown in Table 2.

As shown in Table 2, good appearance without particular generation of a crack, a cleavage or the like in the sheet-shaped gas adsorbent and without finding a discoloration was achieved. The resultant amount of absorbed moisture was: 82 mL/g at 3,000 Pa; and 2.7 mL/g at 10 Pa. In addition, the resultant amount of absorbed nitrogen was: 10.5 mL/g at 80,000 Pa; and 1.1 mL/g at 10 Pa. The resultant tensile strength was 100.1 MPa, and the resultant thickness available for the production of the sheet was 10 μm.

While the present Example employed the polypropylene (PP) as the thermoplastic resin in place of the high density polyethylene (HDPE) of Example 7 as described above, the sheet-shaped gas adsorbent having similar physical properties as in Example 7 was able to be obtained.

Hence, even in the present Example 8, the sheet-shaped gas adsorbent, which was capable of adsorbing moisture within a range of the ambient temperature and under low partial pressure with large capacitance, was able to be produced. In addition, the blending quantity of the copper ion-exchanged ZSM-5 type zeolite over the thermoplastic resin and the temperature of the thermoplastic resin in thermal forming process were suitably limited, and further, the vacuum thermal processing was conducted for the copper ion-exchanged ZSM-5 type zeolite as the pretreatment, to allow inhibiting a generation of a crack, a cleavage, a discoloration or the like in the sheet-shaped gas adsorbent, and to present the thickness available for the production of the sheet as being equal to or smaller than 10 μm.

Example 9

Nylon (Ny) having a softening point of 225 degrees C. was employed as the thermoplastic resin. Then, the copper ion-exchanged ZSM-5 type zeolite was blended so as to adjust 40 pbw over 100 pbw of the nylon, and the sheet-shaped gas adsorbent was extruded with an extruder. In addition to above, a vacuum thermal processing at 600 degrees C. for 4 hours was conducted for the copper ion-exchanged ZSM-5 type zeolite in advance. In addition, the heating temperature in the extrusion process (resin temperature during the forming) was 250 degrees C. The results of the evaluations for the obtained sheet-shaped gas adsorbent of the present Example is shown in Table 2.

As shown in Table 2, good appearance without particular generation of a crack, a cleavage or the like in the sheet-shaped gas adsorbent and without finding a discoloration was achieved. The resultant amount of absorbed moisture was: 81 mL/g at 3,000 Pa; and 2.8 mL/g at 10 Pa. In addition, the resultant amount of absorbed nitrogen was: 10.8 mL/g at 80,000 Pa; and 1.1 mL/g at 10 Pa. The resultant tensile strength was 180.9 MPa, and the resultant thickness available for the production of the sheet was 10 μm.

While the present Example employed the nylon (Ny) as the thermoplastic resin in place of the high density polyethylene (HDPE) of Example 7 as described above, the sheet-shaped gas adsorbent having similar physical properties as in Example 7 was able to be obtained.

Hence, even in the present Example 9, the sheet-shaped gas adsorbent, which was capable of adsorbing moisture within a range of the ambient temperature and under low partial pressure with large capacitance, was able to be produced. In addition, the blending quantity of the copper ion-exchanged ZSM-5 type zeolite over the thermoplastic resin and the temperature of the thermoplastic resin in thermal forming process were suitably limited, and further, the vacuum thermal processing was conducted for the copper ion-exchanged ZSM-5 type zeolite as the pretreatment, to allow inhibiting a generation of a crack, a cleavage, a discoloration or the like in the sheet-shaped gas adsorbent, and to present the thickness available for the production of the sheet as being equal to or smaller than 10 μm.

Comparative Example 1

High density polyethylene (HDPE) having a softening point of 130 degrees C. was employed as the thermoplastic resin. Then, the copper ion-exchanged X-type zeolite was blended so as to adjust 20 pbw over 100 pbw of the high density polyethylene, and the sheet-shaped gas adsorbent was extruded with an extruder.

Here, the copper ion-exchanged X-type zeolite is a product of the X-type zeolite that is a general-purpose zeolite commonly employed as the moisture adsorbent, on which ion exchanging with copper ion is carried out as described above, and no particular pretreatment was conducted for this copper ion-exchanged X-type zeolite. In addition, the heating temperature in the extrusion process (resin temperature during the forming) was 190 degrees C. The results of the evaluations for the obtained comparative sheet-shaped gas adsorbent of the present Comparative Example is shown in Table 2.

Since the copper ion-exchanged X-type zeolite was employed in place of the copper ion-exchanged ZSM-5 type zeolite as shown in Table 2, the resultant amount of absorbed moisture was: 11 mL/g at 3,000 Pa; and 0 mL/g at 10 Pa, which indicated that the amount of absorbed moisture was decreased, as compared with the sheet-shaped gas adsorbent of Example 1 having the equivalent volume of the gas adsorbing component. In addition, the resultant amount of absorbed nitrogen was 0 mL/g for both conditions of 80,000 Pa and 10 Pa. In addition to above, good appearance without particular generation of a crack, a cleavage or the like in the sheet and without finding a discoloration was achieved. Further, the resultant tensile strength was 29 MPa, and the resultant thickness available for the production of the sheet was 10 μm.

As described above, it was found that, even if the ion exchanging with copper ion was conducted over the X-type zeolite that is the general-purpose zeolite to use the resultant zeolite as the gas adsorbing component, the amount of absorbed moisture of the obtained comparative sheet-shaped gas adsorbent was lower than the amount of absorbed moisture of the sheet-shaped gas adsorbent of Example 1. Hence, it was found that the sheet-shaped gas adsorbent obtained by employing the zeolite except the copper ion-exchanged ZSM-5 type zeolite exhibited insufficient ability of adsorbing the moisture under the low partial pressure at a temperature within the range of the ambient temperature with larger capacity, and also insufficient ability of adsorbing air.

Comparative Example 2

High density polyethylene (HDPE) having a softening point of 130 degrees C. was employed as the thermoplastic resin. Then, the copper ion-exchanged X-type zeolite was blended so as to adjust 40 pbw over 100 pbw of the high density polyethylene, and the sheet-shaped gas adsorbent was extruded with an extruder.

Here, the copper ion-exchanged X-type zeolite is a product of the X-type zeolite that is a general-purpose zeolite commonly employed as the moisture adsorbent, on which ion exchanging with copper ion is carried out as described above, and a vacuum thermal processing at 600 degrees C. for 4 hours was conducted for the copper ion-exchanged X-type zeolite in advance. In addition, the heating temperature in the extrusion process (resin temperature during the forming) was 190 degrees C. The results of the evaluations for the obtained comparative sheet-shaped gas adsorbent of the present Comparative Example is shown in Table 2.

Since the copper ion-exchanged X-type zeolite was employed in place of the copper ion-exchanged ZSM-5 type zeolite as shown in Table 2, the resultant amount of absorbed moisture was: 23 mL/g at 3,000 Pa; and 0 mL/g at 10 Pa, which indicated that the amount of absorbed moisture was decreased, as compared with the sheet-shaped gas adsorbent of Example 2 having the equivalent volume of the gas adsorbing component. Despite the copper ion-exchanged X-type zeolite was preliminarily treated with the vacuum thermal processing similarly as in the case of the copper ion-exchanged ZSM-5 type zeolite, the resultant amount of absorbed nitrogen was 0 mL/g for both conditions of 80,000 Pa and 10 Pa. In addition to above, good appearance without particular generation of a crack, a cleavage or the like in the sheet and without finding a discoloration was achieved. Further, the resultant tensile strength was 28.4 MPa, and the resultant thickness available for the production of the sheet was 10 μm.

As described above, it was found that, even if the ion exchanging with copper ion was conducted over the X-type zeolite that is the general-purpose zeolite to use the resultant zeolite as the gas adsorbing component, the amount of absorbed moisture of the obtained comparative sheet-shaped gas adsorbent was lower than the amount of absorbed moisture of the sheet-shaped gas adsorbent of Example 2. It was also found that the amount of absorbed moisture and the amount of absorbed nitrogen were reduced, even though the blending quantity of the copper ion-exchanged X-type zeolite was increased as compared with the sheet-shaped gas adsorbent of Example 1. In addition, even though the vacuum thermal processing at 600 degrees C. for 4 hours was conducted over the copper ion-exchanged X-type zeolite, the obtained comparative sheet-shaped gas adsorbent exhibited no nitrogen adsorptive performance.

Hence, it has been found that the sheet-shaped gas adsorbent obtained by employing the zeolite except the copper ion-exchanged ZSM-5 type zeolite exhibited insufficient ability of adsorbing the moisture under the low partial pressure at a temperature within the range of the ambient temperature with larger capacity, and insufficient ability of adsorbing air, even though the vacuum thermal processing was conducted as the pretreatment.

Comparative Example 3

Evaluations of the amount of absorbed moisture of the commercially available calcium oxide itself alone, which is a general-purpose moisture adsorbent, were conducted similarly as in Examples 1 to 9. In addition to above, the evaluations were conducted without blending calcium oxide into a thermoplastic resin to form a sheet-like form. The results are shown in Table 2.

As shown in Table 2, the resultant amount of absorbed moisture was: 10.8 mL/g at 3,000 Pa; and 0.1 mL/g at 10 Pa, which indicated that the amount of absorbed moisture was lower as compared with the sheet-shaped gas adsorbents of Examples 1 to 9.

In addition, since calcium oxide is employed as the "gas adsorbing component" ordinarily in a conformation of granular or powder calcium oxide encapsulated within a nonwoven fabric, applicable space for that conformation is limited, and it is not appropriate for applications, which require highly removing the moisture.

TABLE 3

|  |  |  | EXAMPLE 10 | EXAMPLE 11 | EXAMPLE 12 | EXAMPLE 13 |
|---|---|---|---|---|---|---|
| PRODUCTION CONDITIONS | THERMO-PLASTIC RESINS | TYPE | HDPE | HDPE | HDPE | HDPE |
|  |  | SOFTENING POINT [° C.] | 130 | 130 | 130 | 130 |
|  |  | RESIN TEMPERATURE DURING FORMING [° C.] | 190 | 190 | 190 | 200 |
|  | GAS ADSORBING COMPONENT | TYPE | COPPER ION-EXCHANGED ZSM-5 TYPE ZEOLITE | COPPER ION-EXCHANGED ZSM-5 TYPE ZEOLITE | COPPER ION-EXCHANGED ZSM-5 TYPE ZEOLITE | COPPER ION-EXCHANGED ZSM-5 TYPE ZEOLITE |
|  |  | BLENDING QUALITY (OVER 100 PBW OF THERMOPLASTIC RESIN) | 20 | 40 | 42 | 20 |
|  |  | PRETREATMENT DONE/NOT IF DONE, ITS CONDITION | NOT | NOT | NOT | NOT |
| EVALUATION RESULTS | APPEARANCE |  | GOOD | GOOD | CLEAVAGE | DISCOLORATION |
|  | AMOUNT OF ABSORBED MOISTURE (3,000 Pa) [mL/g] |  | 22 | 45 | 30 | 17 |
|  | AMOUNT OF ABSORBED MOISTURE (10 Pa) [mL/g] |  | 0.1 | 0.3 | 0 | 0 |
|  | AMOUNT OF ABSORBED NITROGEN (80,000 Pa) [mL/g] |  | 0 | 1 | 0 | 0 |
|  | AMOUNT OF ABSORBED NITROGEN (10 Pa) [mL/g] |  | 0 | 0.1 | 0 | 0 |
|  | TENSILE STRENGTH [MPa] |  | 30.2 | 32.2 | 30.8 | 50 |
|  | THICKNESS AVAILABLE FOR PRODUCTION [μm] |  | 10 | 10 | 123 | 150 |
| INSULATING BODY | APPEARANCE |  | GOOD | GOOD | SLIGHT IRREGULARITY | GOOD |
|  | INTERNAL PRESSURE [Pa] |  | 15 | 12 | 15 | 15 |
|  | THERMAL CONDUCTIVITY [W/mK] |  | 0.003 | 0.0028 | 0.0036 | 0.0036 |

|  |  |  |  | EXAMPLE 14 | EXAMPLE 15 | EXAMPLE 16 |
|---|---|---|---|---|---|---|
|  | PRODUCTION CONDITIONS | THERMO-PLASTIC RESINS | TYPE | HDPE | HDPE | HDPE |
|  |  |  | SOFTENING POINT [° C.] | 130 | 130 | 130 |
|  |  |  | RESIN TEMPERATURE DURING FORMING [° C.] | 220 | 190 | 190 |
|  |  | GAS ADSORBING COMPONENT | TYPE | COPPER ION-EXCHANGED ZSM-5 TYPE ZEOLITE | COPPER ION-EXCHANGED ZSM-5 TYPE ZEOLITE | COPPER ION-EXCHANGED ZSM-5 TYPE ZEOLITE |
|  |  |  | BLENDING QUALITY (OVER 100 PBW OF THERMOPLASTIC RESIN) | 20 | 40 | 40 |
|  |  |  | PRETREATMENT DONE/NOT IF DONE, ITS CONDITION | NOT | THERMAL DRYING, 200° C., 4 HOURS | VACUUM THERMAL PROCESSING, 600° C., 4 HOURS |
|  | EVALUATION RESULTS | APPEARANCE |  | DISCOLORATION, CRACK | GOOD | GOOD |
|  |  | AMOUNT OF ABSORBED MOISTURE (3,000 Pa) [mL/g] |  | 12 | 62 | 80 |
|  |  | AMOUNT OF ABSORBED MOISTURE (10 Pa) [mL/g] |  | 0 | 1 | 2.5 |
|  |  | AMOUNT OF ABSORBED NITROGEN (80,000 Pa) [mL/g] |  | 0 | 2.1 | 10.9 |
|  |  | AMOUNT OF ABSORBED NITROGEN (10 Pa) [mL/g] |  | 0 | 0.3 | 1 |
|  |  | TENSILE STRENGTH [MPa] |  | 34.5 | 33 | 33.1 |
|  |  | THICKNESS AVAILABLE FOR PRODUCTION [μm] |  | 180 | 10 | 10 |
|  | INSULATING BODY | APPEARANCE |  | SLIGHT IRREGULARITY | GOOD | GOOD |
|  |  | INTERNAL PRESSURE [Pa] |  | 15 | 8 | 1 |
|  |  | THERMAL CONDUCTIVITY [W/mK] |  | 0.0036 | 0.0028 | 0.002 |

Example 10

High density polyethylene (HDPE) having a softening point of 130 degrees C. was employed as the thermoplastic resin. Then, the copper ion-exchanged ZSM-5 type zeolite was blended so as to adjust 20 pbw over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature during the forming) was 190 degrees C.

In addition, a rectangular laminate film having a triple-layered configuration, which was configured by laminating, in sequence from the outside toward the inside, a surface protective layer, a gas barrier layer, and a thermally welded layer, was employed. In this case, the surface protective layer was a nylon (Ny) film, the gas barrier layer was an aluminum foil, and the thermally welded layer was a polyethylene (PE) film. Two sheets of the laminate films were stacked and three sides of the stack were thermally welded, and the remaining one side was left as an opened state to form a bag-shaped sheath member.

Further, a glass wool-formed product was employed for a core member, the sheet-shaped gas adsorbent was stacked over this core member to be inserted in the inside of the sheath member. Then, the sheath member having the core member and the sheet-shaped gas adsorbent inserted therein was placed in the interior of a chamber, which was connected to a vacuum pump, and the inside of the chamber was depressurized to a level of 10 Pa. Eventually, the remained one side of the sheath member in the state of open was sealed by the thermal welding to produce the insulating body of the present Example.

Evaluation results of the obtained insulating body of the present example and the sheet-shaped gas adsorbent applied for this insulating body are shown in Table 3.

As shown in Table 3, good appearance of the sheet-shaped gas adsorbent without particular generation of a crack, a cleavage or the like in the sheet and without finding a discoloration was achieved. The resultant amount of absorbed moisture was: 22 mL/g at 3,000 Pa; and 0.1 mL/g at 10 Pa. In addition, the resultant amount of absorbed nitrogen was 0 mL/g for both conditions of 80,000 Pa and 10 Pa. The resultant tensile strength was 30.2 MPa, and the resultant thickness available for the production of the sheet was 10 μm.

Further, concerning the appearance of the insulating body, the surface was smooth, and improved flatness was obtained, as shown in Table 3. Further, the internal pressure was 15 Pa, and the thermal conductivity was 0.0030 W/mK. Meanwhile, due to the influences of the pressure distribution within the chamber, the influences of the moisture and air adhered onto the core member, and the influences of the moisture and air adhered onto the inner surface of the sheath member and the like, the pressure in the chamber during the production of the insulating body is not necessarily identical to the internal pressure of the insulating body.

In the present Example, 20 pbw of the copper ion-exchanged ZSM-5 type zeolite was blended as the gas adsorbing component. On the contrary, in Comparative Example 5 as will be discussed later, 20 pbw of copper ion-exchanged X-type zeolite was blended as the gas adsorbing component (see Table 4), and in Comparative Example 7, commercially available calcium oxide (marketed product), which serves as a general-purpose moisture adsorbent, was employed as the gas adsorbing component. It was clarified that the sheet-shaped gas adsorbent of the present Example exhibited enhanced amount of absorbed moisture, as compared with the comparative sheet-shaped gas adsorbent of Comparative Example 5 or with the gas adsorbent of Comparative Example 7.

Also, since the blending quantity of the copper ion-exchanged ZSM-5 type zeolite over the thermoplastic resin was equal to or lower than 40 pbw, the sheet-shaped gas adsorbent having improved strength was obtained without generating a crack, a cleavage or the like in the sheet-shaped gas adsorbent.

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged ZSM-5 type zeolite (generation of copper corrosion) was sufficiently inhibited. Hence, the sheet-shaped gas adsorbent having sufficient strength was able to be easily produced.

Since the sheet-shaped gas adsorbent is capable of adsorbing moisture within a range of the ambient temperature and under low partial pressure with larger capacitance, the insulating body of the present example employing this sheet-shaped gas adsorbent allows the adsorptive removal of the moisture, which has been adhered onto the inner surface of the core member and/or the sheath member and has not yet been completely removed therefrom by a vacuum pump. Hence, the internal pressure of the insulating body can be further reduced.

Here, Comparative Example 4, as will be discussed later, employed none of the gas adsorbing component such as the sheet-shaped gas adsorbent or other known moisture adsorbent or the like in the insulating body having similar configuration as employed in the present Example. Hence, the insulating body of the present Example was able to provide reduced internal pressure, as compared with: the insulating body of Comparative Example 4 employing no gas adsorbent; the insulating body of Comparative Example 5 containing the same amount the copper ion-exchanged X-type zeolite added therein; and Comparative Example 7 employing calcium oxide serving as a general-purpose moisture adsorbent (commercially available product). This resulted in effectively decreasing the thermal conductivity, so that the insulating body having improved thermal insulation performance was able to be obtained. Further, since the moisture entered through the sheath member as time advances was also able to be highly removed via the adsorption, the obtained insulating body exhibited enhanced durability over time.

Further, no problem related to the appearance such as a crack, a cleavage and the like was generated in the sheet-shaped gas adsorbent and the thickness available for the production of the sheet was able to be provided as 10 μm, so that, even if the sheet-shaped gas adsorbent was applied in the insulating body, it did not occupy larger space in the inside of the insulating body. Hence, the negative influence of the sheet-shaped gas adsorbent for thermal conductivity was able to be avoided without deteriorating the appearance of the insulating body.

Since the sheet-shaped gas adsorbent, which was capable of adsorbing moisture within a range of the ambient temperature and under low partial pressure with large capacitance, was employed in the present Example 10 as described above, the insulating body exhibiting enhanced thermal insulation performance was able to be produced. In addition, the blending quantity of the copper ion-exchanged ZSM-5 type zeolite over the thermoplastic resin and the temperature of the thermoplastic resin in thermal forming process were suitably limited to allow inhibiting a generation of a crack, a cleavage, a discoloration or the like in the sheet-shaped gas adsorbent, and presenting the thickness available for the production of the sheet as being equal to or smaller than 10 μm. Hence, even if this sheet-shaped gas adsorbent was employed, the appearance of the insulating body was not deteriorated.

Example 11

High density polyethylene (HDPE) having a softening point of 130 degrees C. was employed as the thermoplastic resin. Then, the copper ion-exchanged ZSM-5 type zeolite was blended so as to adjust 40 pbw over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature during the forming) was 190 degrees C.

Further, the insulating body of the present example was produced by using the obtained sheet-shaped gas adsorbent in the similar procedure as employed in Example 10. Evaluation results of the obtained insulating body of the present example, and the sheet-shaped gas adsorbent applied for this insulating body, are shown in Table 3.

As shown in Table 3, good appearance of the sheet-shaped gas adsorbent without particular generation of a crack, a cleavage or the like in the sheet and without finding a discoloration was achieved. The resultant amount of absorbed moisture was: 45 mL/g at 3,000 Pa; and 0.3 mL/g at 10 Pa. In addition, the resultant amount of absorbed nitrogen was: 1 mL/g at 80,000 Pa; and 0.1 mL/g at 10 Pa. The resultant tensile strength was 30.2 MPa, and the resultant thickness available for the production of the sheet was 10 μm.

Further, concerning the appearance of the insulating body, the surface was smooth, and improved flatness was obtained, as shown in Table 3. The internal pressure of the insulating body was 12 Pa, and the thermal conductivity was 0.0028 W/mK.

In the present Example, 40 pbw of the copper ion-exchanged ZSM-5 type zeolite was blended as the gas adsorbing component. Hence, it was clarified that the sheet-shaped gas adsorbent of the present Example exhibited enhanced amount of absorbed moisture, as compared with the comparative sheet-shaped gas adsorbent of Comparative Example 6 (see Table 4) or with the gas adsorbent of Comparative Example 7 (see Table 4).

Also, since the blending quantity of the copper ion-exchanged ZSM-5 type zeolite over the thermoplastic resin was equal to or lower than 40 pbw, the sheet-shaped gas adsorbent having improved strength was obtained without generating a crack, a cleavage or the like in the sheet-shaped gas adsorbent.

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged ZSM-5 type zeolite (generation of copper corrosion) was sufficiently inhibited. Hence, the sheet-shaped gas adsorbent having sufficient strength was able to be easily produced.

Since the sheet-shaped gas adsorbent is capable of adsorbing moisture within a range of the ambient temperature and under low partial pressure with larger capacitance, the insulating body of the present example employing this sheet-shaped gas adsorbent allows the adsorptive removal of the moisture, which has been adhered onto the inner surface of the core member and/or the sheath member and has not yet been completely removed therefrom by a vacuum pump. Hence, the internal pressure of the insulating body can be further reduced.

Also, the insulating body of the present Example was able to provide reduced internal pressure, as compared with: the insulating body of Comparative Example 4 employing no gas adsorbent; the insulating body of Comparative Example 6 containing substantially the same amount the copper ion-exchanged X-type zeolite added therein; and Comparative Example 7 employing calcium oxide serving as a general-purpose moisture adsorbent (commercially available product). This resulted in effectively decreasing the thermal conductivity, so that the insulating body having improved thermal insulation performance was able to be obtained. Further, since the moisture entered through the sheath member as time advances was also able to be highly removed via the adsorption, the obtained insulating body exhibited enhanced durability over time.

Further, no problem related to the appearance such as a crack, a cleavage and the like was generated in the sheet-shaped gas adsorbent and the thickness available for the production of the sheet was able to be provided as 10 μm, so that, even if the sheet-shaped gas adsorbent was applied in the insulating body, it did not occupy larger space in the inside of the insulating body. Hence, the negative influence of the sheet-shaped gas adsorbent for thermal conductivity was able to be avoided without deteriorating the appearance of the insulating body.

Since the sheet-shaped gas adsorbent, which was capable of adsorbing moisture within a range of the ambient temperature and under low partial pressure with large capacitance, was employed in the present Example 11 as described above, the insulating body exhibiting enhanced thermal insulation performance was able to be produced. In addition, the blending quantity of the copper ion-exchanged ZSM-5 type zeolite over the thermoplastic resin and the temperature of the thermoplastic resin in thermal forming process were suitably limited to allow inhibiting a generation of a crack, a cleavage, a discoloration or the like in the sheet-shaped gas adsorbent, and presenting the thickness available for the production of the sheet as being equal to or smaller than 10 μm. Hence, even if this sheet-shaped gas adsorbent was employed, the appearance of the insulating body was not deteriorated.

Example 12

High density polyethylene (HDPE) having a softening point of 130 degrees C. was employed as the thermoplastic resin. Then, the copper ion-exchanged ZSM-5 type zeolite was blended so as to adjust 42 pbw over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature during the forming) was 190 degrees C.

Further, the insulating body of the present example was produced by using the obtained sheet-shaped gas adsorbent in the similar procedure as employed in Example 10. Evaluation results of the obtained insulating body of the present example, and the sheet-shaped gas adsorbent applied for this insulating body, are shown in Table 3.

As shown in Table 3, concerning the appearance of the sheet-shaped gas adsorbent, a generation of a cleavage was confirmed in a portion of the sheet-shaped gas adsorbent. The resultant amount of absorbed moisture was: 30 mL/g at 3,000 Pa; and 0 mL/g at 10 Pa. In addition, the resultant amount of absorbed nitrogen was 0 mL/g for both conditions of 80,000 Pa and 10 Pa. The thickness available for the production of the sheet was 123 μm shortly before a cleavage was generated in a portion of the sheet-shaped gas adsorbent, and although the sheet thickness was 123 μm, which was thicker as compared with the sheet-shaped gas adsorbents of Examples 10 and 11, the tensile strength was 30.8 MPa, which was substantially equivalent thereto.

Further, as shown in table 3, concerning the appearance of the insulating body, an irregularity resulted from the cleavage in the sheet-shaped gas adsorbent was generated in the surface, and thus the flatness was further deteriorated, as compared with the insulating bodies of and Examples 10 and 11. Further, the internal pressure of the insulating body was 15 Pa, and the thermal conductivity was 0.0036 W/mK. Although the internal pressure was equivalent to the insulating body of Example 10, the thermal conductivity was slightly increased than the insulating body of Example 10.

In the present Example, 42 pbw of the copper ion-exchanged ZSM-5 type zeolite was blended as the gas adsorbing component. Hence, it was clarified that the sheet-shaped gas adsorbent of the present Example exhibited enhanced amount of absorbed moisture, as compared with the comparative sheet-shaped gas adsorbent of Comparative Example 6 (see Table 4) or with the gas adsorbent of Comparative Example 7 (see Table 4).

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged ZSM-5 type zeolite (generation of copper corrosion) was sufficiently inhibited. Hence, the sheet-shaped gas adsorbent having sufficient strength was able to be easily produced.

However, since the blending quantity of the copper ion-exchanged ZSM-5 type zeolite for thermoplastic resin was higher than 40 pbw, a cleavage was generated in a portion of the sheet-shaped gas adsorbent. Thus, the thickness available for the production of the sheet was 123 μm, which is thicker as compared with the sheet-shaped gas adsorbents of Examples 10 and 11, and further reduction of the thickness was difficult.

Also, although the thickness available for the production of the sheet was thicker as compared with the sheet-shaped gas adsorbents of Examples 10 and 11, the tensile strength was equivalent thereto. It is considered that this is because the excessive blending quantity of the copper ion-exchanged ZSM-5 type zeolite presumably deteriorates the relative strength of the resin.

Since the sheet-shaped gas adsorbent is capable of adsorbing moisture within a range of the ambient temperature and under low partial pressure with larger capacitance, the insulating body of the present example employing this sheet-shaped gas adsorbent allows the adsorptive removal of the moisture, which has been adhered onto the inner surface of the core member and/or the sheath member and has not yet been completely removed therefrom by a vacuum pump. Hence, the internal pressure of the insulating body can be further reduced.

Also, the insulating body of the present Example was able to provide reduced internal pressure, as compared with: the insulating body of Comparative Example 4 employing no gas adsorbent; the insulating body of Comparative Example 6 containing similar amount the copper ion-exchanged X-type zeolite added therein; and Comparative Example 7 employing calcium oxide serving as a general-purpose moisture adsorbent (commercially available product). This resulted in effectively decreasing the thermal conductivity, so that the insulating body having improved thermal insulation performance was able to be obtained. Further, since the moisture entered through the sheath member as time advances was also able to be highly removed via the adsorption, the obtained insulating body exhibited enhanced durability over time.

However, as described above, since the blending quantity of the copper ion-exchanged ZSM-5 type zeolite for thermoplastic resin was higher than 40 pbw, a cleavage was generated in a portion of the sheet-shaped gas adsorbent, and the thickness available for the production of the sheet was 123 μm, which is thicker as compared with the sheet-shaped gas adsorbents of Examples 10 and 11. Hence, an irregularity was slightly generated in the surface of the insulating body of the present Example, and thus the flatness was deteriorated as compared with the insulating bodies of Examples 10 and 11. Further, the thermal conductivity of the insulating body of the present Example was deteriorated, as compared with the insulating body of Example 10.

Since the sheet-shaped gas adsorbent, which was capable of adsorbing moisture within a range of the ambient temperature and under low partial pressure with large capacitance, was employed in the present Example 12 as described above, the insulating body exhibiting enhanced thermal insulation performance was able to be produced. However, if the blending quantity of the copper ion-exchanged ZSM-5 type zeolite for thermoplastic resin is higher than 40 pbw, a cleavage may be possibly generated in a portion of the sheet-shaped gas adsorbent, and a harmful influence may be given to the thermal conductivity and the appearance of the insulating body. Hence, it was found that the blending quantity of the copper ion-exchanged ZSM-5 type zeolite is preferably equal to or lower than 40 pbw, if the application is to place importance on the strength and the appearance.

Example 13

High density polyethylene (HDPE) having a softening point of 130 degrees C. was employed as the thermoplastic resin. Then, the copper ion-exchanged ZSM-5 type zeolite was blended so as to adjust 20 pbw over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature during the forming) was 200 degrees C.

Further, the insulating body of the present example was produced by using the obtained sheet-shaped gas adsorbent in the similar procedure as employed in Example 10. Evaluation results of the obtained insulating body of the present example, and the sheet-shaped gas adsorbent applied for this insulating body, are shown in Table 3.

As shown in Table 3, concerning the appearance of the sheet-shaped gas adsorbent, a dark brown discoloration was confirmed. The resultant amount of absorbed moisture was: 17 mL/g at 3,000 Pa; and 0 mL/g at 10 Pa. In addition, the resultant amount of absorbed nitrogen was 0 mL/g for both conditions of 80,000 Pa and 10 Pa. The resultant tensile strength was 50.2 MPa, and the resultant thickness available for the production of the sheet was 150 μm.

Further, concerning the appearance of the insulating body, the surface was smooth, and improved flatness was obtained, as shown in Table 3. The internal pressure of the insulating body was 15 Pa, and the thermal conductivity was 0.0036 W/mK. Although the internal pressure was equivalent to the insulating body of Example 10, the thermal conductivity was slightly increased than the insulating body of Example 10.

In the present Example, 20 pbw of the copper ion-exchanged ZSM-5 type zeolite was blended as the gas adsorbing component. Hence, it was clarified that the sheet-shaped gas adsorbent of the present Example exhibited enhanced amount of absorbed moisture, as compared with the comparative sheet-shaped gas adsorbent of Comparative Example 5 (see Table 4) or with the gas adsorbent of Comparative Example 7 (see Table 4).

However, the heating temperature of the high density polyethylene during the extrusion process was 200 degrees C., which is higher than the heating upper limit temperature (190 degrees C. that is higher than the softening point, 130 degrees C., of the high density polyethylene by 60 degrees C.). Hence, a copper corrosion was generated in the high density polyethylene due to copper ion contained in the copper ion-exchanged ZSM-5 type zeolite, which resulted in a generation of a discoloration in the sheet-shaped gas adsorbent.

Also, since an embrittlement of the high density polyethylene was generated, which was presumably derived from the copper corrosion, excessive reduction of the sheet thickness induced the generations of cracks, cleavages, and the like. Hence, the thickness available for the production of the sheet was 150 µm, which is thicker as compared with the sheet-shaped gas adsorbents of Examples 10 and 11, and further reduction of the thickness was difficult. In addition, although the thickness available for the production of the sheet was thicker as compared with the sheet-shaped gas adsorbents of Examples 10 and 11, the width of the increase in the tensile strength was small. Hence, it was considered that the relative strength of the resin was deteriorated, as compared with the sheet-shaped gas adsorbents of Examples 10 and 11.

Since the sheet-shaped gas adsorbent is capable of adsorbing moisture within a range of the ambient temperature and under low partial pressure with larger capacitance, the insulating body of the present example employing this sheet-shaped gas adsorbent allows the adsorptive removal of the moisture, which has been adhered onto the inner surface of the core member and/or the sheath member and has not yet been completely removed therefrom by a vacuum pump. Hence, the internal pressure of the insulating body can be further reduced.

Further, the insulating body of the present Example was able to provide reduced internal pressure, as compared with: the insulating body of Comparative Example 4 employing no gas adsorbent; the insulating body of Comparative Example 5 containing substantially the same amount the copper ion-exchanged X-type zeolite added therein; and Comparative Example 7 employing calcium oxide serving as a general-purpose moisture adsorbent (commercially available product). This resulted in effectively decreasing the thermal conductivity, so that the insulating body having improved thermal insulation performance was able to be obtained. Further, since the moisture entered through the sheath member as time advances was also able to be highly removed via the adsorption, the obtained insulating body exhibited enhanced durability over time.

However, since the heating temperature of the high density polyethylene during the extrusion process was 200 degrees C., which is higher than the heating upper limit temperature (190 degrees C.) as described above, a copper corrosion was generated in the high density polyethylene due to copper ion contained in the copper ion-exchanged ZSM-5 type zeolite, and thus a generation of a discoloration was caused in the sheet-shaped gas adsorbent. Further, since the thickness available for the production of the sheet was 150 µm, which is thicker as compared with the sheet-shaped gas adsorbents of Examples 10 and 11, the thermal conductivity of the insulating body of the present Example was deteriorated, as compared with the insulating body of Example 10.

Since the sheet-shaped gas adsorbent, which was capable of adsorbing moisture within a range of the ambient temperature and under low partial pressure with large capacitance, was employed in the present Example 13 as described above, the insulating body exhibiting enhanced thermal insulation performance was able to be produced. However, there is a concern that the increase in the thickness available for the production of the sheet adversely affects the thermal conductivity of the insulating body. Hence, it was found that the resin temperature during the forming was equal to or lower than the heating upper limit temperature, namely a temperature of higher than the softening point of the thermoplastic resin by 60 degrees C., if the application is to place importance on the thermal conductivity of the insulating body.

Example 14

High density polyethylene (HDPE) having a softening point of 130 degrees C. was employed as the thermoplastic resin. Then, the copper ion-exchanged ZSM-5 type zeolite was blended so as to adjust 20 pbw over 100 pbw of the high density polyethylene, and the sheet-shaped gas adsorbent was extruded with an extruder. In addition to above, no particular pretreatment was conducted for the copper ion-exchanged ZSM-5 type zeolite. In addition, the heating temperature in the extrusion process (resin temperature during the forming) was 220 degrees C.

Further, the insulating body of the present example was produced by using the obtained sheet-shaped gas adsorbent in the similar procedure as employed in Example 10. Evaluation results of the obtained insulating body of the present example, and the sheet-shaped gas adsorbent applied for this insulating body, are shown in Table 3.

As shown in table 3, concerning the appearance of the sheet-shaped gas adsorbent, a rich dark brown discoloration was confirmed, and further a crack was also confirmed. The resultant amount of absorbed moisture was: 12 mL/g at 3,000 Pa; and 0 mL/g at 10 Pa. In addition, the resultant amount of absorbed nitrogen was 0 mL/g for both conditions of 80,000 Pa and 10 Pa. The resultant tensile strength was 34.5 MPa, and the resultant thickness available for the production of the sheet was 180 µm.

Further, as shown in table 3, concerning the appearance of the insulating body, an irregularity resulted from the cleavage in the sheet-shaped gas adsorbent was generated in the surface, and thus the flatness was further deteriorated, as compared with the insulating bodies of and Examples 10 and 11. Further, the internal pressure of the insulating body was 15 Pa, and the thermal conductivity was 0.0036 W/mK. Although the internal pressure was equivalent to the insulating body of Example 10, the thermal conductivity was slightly increased than the insulating body of Example 10.

In the present Example, 20 pbw of the copper ion-exchanged ZSM-5 type zeolite was blended as the gas adsorbing component. Hence, it was clarified that the sheet-shaped gas adsorbent of the present Example exhibited enhanced amount of absorbed moisture, as compared with the comparative sheet-shaped gas adsorbent of Comparative Example 5 (see Table 4) or with the gas adsorbent of Comparative Example 7 (see Table 4).

However, the heating temperature of the high density polyethylene during the extrusion process was 220 degrees C., which is higher than the heating upper limit temperature (190 degrees C. that is higher than the softening point, 130 degrees C., of the high density polyethylene by 60 degrees C.), and is also higher than 200 degrees C. of Example 4. Hence, a copper corrosion, which was stronger than the sheet-shaped gas adsorbent of Example 13, was generated in the high density polyethylene due to copper ion contained in the copper ion-exchanged ZSM-5 type zeolite, which resulted in generations of not only a discoloration, but also a crack, in the sheet-shaped gas adsorbent.

Also, since an embrittlement of the high density polyethylene was generated, which was presumably derived from the copper corrosion, excessive reduction of the sheet thickness induced the generations of cracks, cleavages, and the like. Hence, the thickness available for the production of the sheet was 180 μm, which is further thicker as compared with the sheet-shaped gas adsorbent of Example 13, and further reduction of the thickness was difficult.

Since the sheet-shaped gas adsorbent is capable of adsorbing moisture within a range of the ambient temperature and under low partial pressure with larger capacitance, the insulating body of the present example employing this sheet-shaped gas adsorbent allows the adsorptive removal of the moisture, which has been adhered onto the inner surface of the core member and/or the sheath member and has not yet been completely removed therefrom by a vacuum pump. Hence, the internal pressure of the insulating body can be further reduced.

Also, the insulating body of the present Example was able to provide reduced internal pressure, as compared with: the insulating body of Comparative Example 4 employing no gas adsorbent; the insulating body of Comparative Example 5 containing substantially the same amount the copper ion-exchanged X-type zeolite added therein; and Comparative Example 7 employing calcium oxide serving as a general-purpose moisture adsorbent (commercially available product). This resulted in effectively decreasing the thermal conductivity, so that the insulating body having improved thermal insulation performance was able to be obtained. Further, since the moisture entered through the sheath member as time advances was also able to be highly removed via the adsorption, the obtained insulating body exhibited enhanced durability over time.

However, since the heating temperature of the high density polyethylene during the extrusion process was 220 degrees C., which is higher than the heating upper limit temperature (190 degrees C.) as described above, a copper corrosion was generated in the high density polyethylene due to copper ion contained in the copper ion-exchanged ZSM-5 type zeolite, and thus generations of a discoloration and a crack were caused in the sheet-shaped gas adsorbent, as compared with the sheet-shaped gas adsorbent of Example 13. Therefore, an irregularity was slightly generated in the surface of the insulating body. Further, since the thickness available for the production of the sheet was 180 μm, which is thicker as compared with the sheet-shaped gas adsorbents of Examples 10 and 11, the thermal conductivity of the insulating body of the present Example was deteriorated, as compared with the insulating body of Example 10.

Since the sheet-shaped gas adsorbent, which was capable of adsorbing moisture within a range of the ambient temperature and under low partial pressure with large capacitance, was employed in the present Example 14 as described above, the insulating body exhibiting enhanced thermal insulation performance was able to be produced. However, there is a concern that the increase in the thickness available for the production of the sheet or the generation of the crack in the appearance adversely affect the thermal conductivity or the appearance of the insulating body. Hence, it was found that the resin temperature during the forming was equal to or lower than the heating upper limit temperature, namely a temperature of higher than the softening point of the thermoplastic resin by 60 degrees C., if the application is to place importance on the thermal conductivity and the appearance of the insulating body.

Example 15

High density polyethylene (HDPE) having a softening point of 130 degrees C. was employed as the thermoplastic resin. Then, the copper ion-exchanged ZSM-5 type zeolite was blended so as to adjust 40 pbw over 100 pbw of the high density polyethylene, and the sheet-shaped gas adsorbent was extruded with an extruder. In addition to above, a thermal drying processing at 200 degrees C. for 4 hours was conducted for the copper ion-exchanged ZSM-5 type zeolite in advance. In addition, the heating temperature in the extrusion process (resin temperature during the forming) was 190 degrees C.

Further, the insulating body of the present example was produced by using the obtained sheet-shaped gas adsorbent in the similar procedure as employed in Example 10. Evaluation results of the obtained insulating body of the present example, and the sheet-shaped gas adsorbent applied for this insulating body, are shown in Table 3.

As shown in Table 3, good appearance without particular generation of a crack, a cleavage or the like in the sheet-shaped gas adsorbent and without finding a discoloration was achieved. The resultant amount of absorbed moisture was: 62 mL/g at 3,000 Pa; and 1.0 mL/g at 10 Pa. In addition, the resultant amount of absorbed nitrogen was: 2.1 mL/g at 80,000 Pa; and 0.3 mL/g at 10 Pa. The resultant tensile strength was 33.0 MPa, and the resultant thickness available for the production of the sheet was 10 μm.

Further, concerning the appearance of the insulating body, the surface was smooth, and improved flatness was obtained, as shown in Table 3. The internal pressure of the insulating body was 8 Pa, and the thermal conductivity was 0.0028 W/mK.

In the present Example, 40 pbw of the copper ion-exchanged ZSM-5 type zeolite was blended as the gas adsorbing component. Hence, it was clarified that the sheet-shaped gas adsorbent of the present Example exhibited particularly enhanced amount of absorbed moisture, as compared with the comparative sheet-shaped gas adsorbent of Comparative Example 6 (see Table 4) or with the gas adsorbent of Comparative Example 7 (see Table 4).

It was also found that the amount of absorbed moisture in the sheet-shaped gas adsorbent of the present Example, in which the pretreatment was conducted for the copper ion-exchanged ZSM-5 type zeolite, was further increased, as compared with the sheet-shaped gas adsorbent of Example 11, which contains the copper ion-exchanged ZSM-5 type zeolite with the equivalent blending quantity. It is considered that this was caused because the thermal processing at 200 degrees C. for 4 hours was conducted as the pretreatment to induce the elimination of the moisture previously contained in the copper ion-exchanged ZSM-5 type zeolite, which allowed further larger volume of the moisture adsorption. In addition, it was also found that a nitrogen adsorptive performance was exhibited by the pretreatment.

Also, since the blending quantity of the copper ion-exchanged ZSM-5 type zeolite over the thermoplastic resin was equal to or lower than 40 pbw, the sheet-shaped gas adsorbent having improved strength was obtained without generating a crack, a cleavage or the like in the sheet-shaped gas adsorbent.

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged ZSM-5 type zeolite (generation of copper corrosion) was sufficiently inhibited. Hence, the sheet-shaped gas adsorbent having sufficient strength was able to be easily produced.

Since the sheet-shaped gas adsorbent is capable of adsorbing moisture within a range of the ambient temperature and under low partial pressure with larger capacitance, the insulating body of the present example employing this sheet-shaped gas adsorbent allows the adsorptive removal of the moisture, which has been adhered onto the inner surface of the core member and/or the sheath member and has not yet been completely removed therefrom by a vacuum pump. Hence, the internal pressure of the insulating body can be further reduced.

Also, the insulating body of the present Example was able to provide reduced internal pressure, as compared with: the insulating body of Comparative Example 4 employing no gas adsorbent; the insulating body of Comparative Example 6 containing substantially the same amount the copper ion-exchanged X-type zeolite added therein; and Comparative Example 7 employing calcium oxide serving as a general-purpose moisture adsorbent (commercially available product). This resulted in effectively decreasing the thermal conductivity, so that the insulating body having improved thermal insulation performance was able to be obtained.

Further, as described above, the thermal drying processing under the conditions of at 200 degrees C. and for 4 hours was conducted as the pretreatment for the copper ion-exchanged ZSM-5 type zeolite to induce the elimination of the moisture previously contained in the copper ion-exchanged ZSM-5 type zeolite, which allowed further larger volume of the moisture adsorption. Hence, it was found that this configuration provided reduced internal pressure and reduced thermal conductivity, as compared with the insulating body and the like of the above-described Examples 10 and 11. Further, since the moisture entered through the sheath member as time advances was also able to be highly removed via the adsorption by the sheet-shaped gas adsorbent, the obtained insulating body exhibited enhanced durability over time.

Further, no problem related to the appearance such as a crack, a cleavage and the like was generated in the sheet-shaped gas adsorbent and the thickness available for the production of the sheet was able to be provided as 10 μm, so that, even if the sheet-shaped gas adsorbent was applied in the insulating body, it did not occupy larger space in the inside of the insulating body. Hence, the negative influence of the sheet-shaped gas adsorbent for thermal conductivity was able to be avoided without deteriorating the appearance of the insulating body.

As described above, in the present Example 15, the insulating body was able to be produced by employing the sheet-shaped gas adsorbent, which was capable of adsorbing moisture within a range of the ambient temperature and under low partial pressure with large capacitance. In addition, the blending quantity of the copper ion-exchanged ZSM-5 type zeolite over the thermoplastic resin and the temperature of the thermoplastic resin in thermal forming process were suitably limited and further the thermal drying processing was conducted for the copper ion-exchanged ZSM-5 type zeolite as the pretreatment to allow inhibiting a generation of a crack, a cleavage, a discoloration or the like in the sheet-shaped gas adsorbent, and presenting the thickness available for the production of the sheet as being equal to or smaller than 10 μm. Hence, the use of this sheet-shaped gas adsorbent provided no deterioration of the appearance of the insulating body.

Example 16

High density polyethylene (HDPE) having a softening point of 130 degrees C. was employed as the thermoplastic resin. Then, the copper ion-exchanged ZSM-5 type zeolite was blended so as to adjust 40 pbw over 100 pbw of the high density polyethylene, and the sheet-shaped gas adsorbent was extruded with an extruder. In addition to above, a vacuum thermal processing at 600 degrees C. for 4 hours was conducted for the copper ion-exchanged ZSM-5 type zeolite in advance. In addition, the heating temperature in the extrusion process (resin temperature during the forming) was 190 degrees C.

Further, the insulating body of the present example was produced by using the obtained sheet-shaped gas adsorbent in the similar procedure as employed in Example 10. Evaluation results of the obtained insulating body of the present example, and the sheet-shaped gas adsorbent applied for this insulating body, are shown in Table 3.

As shown in Table 3, good appearance of the sheet-shaped gas adsorbent without particular generation of a crack, a cleavage or the like and without finding a discoloration was achieved. The resultant amount of absorbed moisture was: 80 mL/g at 3,000 Pa; and 2.5 mL/g at 10 Pa. In addition, the resultant amount of absorbed nitrogen was: 10.9 mL/g at 80,000 Pa; and 1.0 mL/g at 10 Pa. The resultant tensile strength was 33.1 MPa, and the resultant thickness available for the production of the sheet was 10 μm.

Further, concerning the appearance of the insulating body, the surface was smooth, and improved flatness was obtained, as shown in Table 3. The internal pressure of the insulating body was 1 Pa, and the thermal conductivity was 0.0020 W/mK.

In the present Example, 40 pbw of the copper ion-exchanged ZSM-5 type zeolite was blended as the gas adsorbing component. Hence, it was clarified that the sheet-shaped gas adsorbent of the present Example exhibited particularly enhanced amount of absorbed moisture, as compared with the comparative sheet-shaped gas adsorbent of Comparative Example 6 (see Table 4) or with the gas adsorbent of Comparative Example 7 (see Table 4).

Also, it was found that the amount of absorbed moisture in the sheet-shaped gas adsorbent of the present Example, in which the pretreatment was conducted for the copper ion-exchanged ZSM-5 type zeolite, was further increased, as compared with the sheet-shaped gas adsorbent of Example 15, in addition to compared with the sheet-shaped gas adsorbent of Example 11, which contains the copper ion-exchanged ZSM-5 type zeolite with the equivalent blending quantity. It is considered that the vacuum thermal processing was conducted for the copper ion-exchanged ZSM-5 type zeolite as the pretreatment to allow eliminating the moisture, which had been previously contained in the copper ion-exchanged ZSM-5 type zeolite eliminate, and inducing the reduction of $Cu^{2+}$ contained in the copper ion-exchanged ZSM-5 type zeolite into $Cu^+$. Hence, it was found that more enhanced moisture adsorptive performance was able to be exhibited, and similarly, improved air adsorptive performance was also exhibited.

Also, since the blending quantity of the copper ion-exchanged ZSM-5 type zeolite over the thermoplastic resin was equal to or lower than 40 pbw, the sheet-shaped gas adsorbent having improved strength was obtained without generating a crack, a cleavage or the like in the sheet-shaped gas adsorbent.

In addition, since the resin temperature was equal to or lower than the heating upper limit temperature (softening point plus 60 degrees C.) in the thermally forming process with the extruder, an erosion of the thermoplastic resin induced by copper ion contained in the copper ion-exchanged ZSM-5 type zeolite (generation of copper corrosion) was sufficiently inhibited. Hence, the sheet-shaped gas adsorbent having sufficient strength was able to be easily produced.

Since the sheet-shaped gas adsorbent is capable of adsorbing moisture within a range of the ambient temperature and under low partial pressure with larger capacitance, the insulating body of the present example employing this sheet-shaped gas adsorbent allows the adsorptive removal of the moisture, which has been adhered onto the inner surface of the core member and/or the sheath member and has not yet been completely removed therefrom by a vacuum pump. Hence, the internal pressure of the insulating body can be further reduced.

Also, the insulating body of the present Example was able to provide reduced internal pressure, as compared with: the insulating body of Comparative Example 4 employing no gas adsorbent; the insulating body of Comparative Example 6 containing substantially the same amount the copper ion-exchanged X-type zeolite added therein; and Comparative Example 7 employing calcium oxide serving as a general-purpose moisture adsorbent (commercially available product). This resulted in effectively decreasing the thermal conductivity, so that the insulating body having improved thermal insulation performance was able to be obtained.

Further, both of the internal pressure and the thermal conductivity of the insulation member were considerably deteriorated, as compared with the sheet-shaped gas adsorbent of Example 15. This was because, as described above, the vacuum thermal process was conducted as the pretreatment for the copper ion-exchanged ZSM-5 type zeolite to eliminate the moisture, which had been previously contained in such a copper ion-exchanged ZSM-5 type zeolite eliminate and to induce the reduction of $Cu^{2+}$ contained in the copper ion-exchanged ZSM-5 type zeolite into $Cu^+$. It is considered that such a feature allows the sheet-shaped gas adsorbent exhibiting further enhanced moisture adsorptive performance and nitrogen adsorptive performance, so that higher level of the adsorptive removal of the air and the moisture remained in the inside of the insulation member was able to be achieved. Further, since the moisture entered through the sheath member as time advances was also able to be highly removed via the adsorption by the sheet-shaped gas adsorbent, the obtained insulating body exhibited enhanced durability over time.

Further, no problem related to the appearance such as a crack, a cleavage and the like was generated in the sheet-shaped gas adsorbent and the thickness available for the production of the sheet was able to be provided as 10 μm, so that, even if the sheet-shaped gas adsorbent was applied in the insulating body, it did not occupy larger space in the inside of the insulating body. Hence, the negative influence of the sheet-shaped gas adsorbent for thermal conductivity was able to be avoided without deteriorating the appearance of the insulating body.

As described above, in the present Example 16, the insulating body was able to be produced by employing the sheet-shaped gas adsorbent, which was capable of adsorbing moisture within a range of the ambient temperature and under low partial pressure with large capacitance. In addition, the blending quantity of the copper ion-exchanged ZSM-5 type zeolite over the thermoplastic resin and the temperature of the thermoplastic resin in thermal forming process were suitably limited and further the vacuum thermal processing was conducted for the copper ion-exchanged ZSM-5 type zeolite as the pretreatment to allow inhibiting a generation of a crack, a cleavage, a discoloration or the like in the sheet-shaped gas adsorbent, and presenting the thickness available for the production of the sheet as being equal to or smaller than 10 μm. Hence, even if this sheet-shaped gas adsorbent was employed, the appearance of the insulating body was not deteriorated.

TABLE 4

| | | | EXAMPLE 17 | EXAMPLE 18 | COMPARATIVE EXAMPLE 4 | COMPARATIVE EXAMPLE 5 | COMPARATIVE EXAMPLE 6 | COMPARATIVE EXAMPLE 7 |
|---|---|---|---|---|---|---|---|---|
| PRODUCTION CONDITIONS | THERMOPLASTIC RESINS | TYPE | PP | Ny | — | HDPE | HDPE | — |
| | | SOFTENING POINCT [° C.] | 160 | 225 | — | 130 | 130 | — |
| | | RESIN TEMPERATURE DURING FORMING [° C.] | 200 | 250 | — | 190 | 190 | — |
| | GAS ADSORBING COMPONENT | TYPE | COPPER ION-EXCHANGED ZSM-5 TYPE ZEOLITE | COPPER ION-EXCHANGED ZSM-5 TYPE ZEOLITE | — | COPPER ION-EXCHANGED X-TYPE ZEOLITE | COPPER ION-EXCHANGED X-TYPE ZEOLITE | CALCIUM OXIDE |
| | | BLENDING QUALITY (OVER 100 PBW OF THERMOPLASTIC RESIN) | 40 | 40 | — | 20 | 40 | — |
| | | PRETREATMENT DONE/NOT IF DONE, ITS CONDITION | VACUUM THERMAL PROCESSING, 600° C., 4 HOURS | VACUUM THERMAL PROCESSING, 600° C., 4 HOURS | — | NOT | VACUUM THERMAL PROCESSING, 600° C., 4 HOURS | — |
| EVALUATION RESULTS | APPEARANCE | | GOOD | GOOD | — | GOOD | GOOD | — |
| | AMOUNT OF ABSORBED MOISTURE (3,000 Pa) [mL/g] | | 82 | 81 | — | 11 | 23 | 10.8 |
| | AMOUNT OF ABSORBED MOISTURE (10 Pa) [mL/g] | | 2.7 | 2.8 | — | 0 | 0 | 0.1 |
| | AMOUNT OF ABSORBED NITROGEN (80,000 Pa) [mL/g] | | 10.5 | 10.8 | — | 0 | 0 | — |

TABLE 4-continued

|  |  | EXAMPLE 17 | EXAMPLE 18 | COMPARATIVE EXAMPLE 4 | COMPARATIVE EXAMPLE 5 | COMPARATIVE EXAMPLE 6 | COMPARATIVE EXAMPLE 7 |
|---|---|---|---|---|---|---|---|
|  | AMOUNT OF ABSORBED NITROGEN (10 Pa) [mL/g] | 1.1 | 1.1 | — | 0 | 0 | — |
|  | TENSILE STRENGTH [MPa] | 100 | 180 | — | 29 | 28.4 | — |
|  | THICKNESS AVAILABLE FOR PRODUCTION [μm] | 10 | 10 | — | 10 | 10 | — |
| INSULATING BODY | APPEARANCE | GOOD | GOOD | GOOD | GOOD | GOOD | CONSIDERABLE CONVEX |
|  | INTERNAL PRESSURE [Pa] | 2 | 2 | 30 | 20 | 21 | 20 |
|  | THERMAL CONDUCTIVITY [W/mK] | 0.002 | 0.002 | 0.005 | 0.004 | 0.0037 | 0.004 |

Example 17

Polypropylene (PP) having a softening point of 160 degrees C. was employed as the thermoplastic resin. Then, the copper ion-exchanged ZSM-5 type zeolite was blended so as to adjust 40 pbw over 100 pbw of the polypropylene, and the sheet-shaped gas adsorbent was extruded with an extruder. In addition to above, a vacuum thermal processing at 600 degrees C. for 4 hours was conducted for the copper ion-exchanged ZSM-5 type zeolite in advance. In addition, the heating temperature in the extrusion process (resin temperature during the forming) was 200 degrees C.

Further, the insulating body of the present example was produced by using the obtained sheet-shaped gas adsorbent in the similar procedure as employed in Example 10. Evaluation results of the obtained insulating body of the present example, and the sheet-shaped gas adsorbent applied for this insulating body, are shown in Table 4.

As shown in Table 4, good appearance of the sheet-shaped gas adsorbent without particular generation of a crack, a cleavage or the like and without finding a discoloration was achieved. The resultant amount of absorbed moisture was: 82 mL/g at 3,000 Pa; and 2.7 mL/g at 10 Pa. In addition, the resultant amount of absorbed nitrogen was: 10.5 mL/g at 80,000 Pa; and 1.1 mL/g at 10 Pa. The resultant tensile strength was 100.1 MPa, and the resultant thickness available for the production of the sheet was 10 μm.

Further, concerning the appearance of the insulating body, the surface was smooth, and improved flatness was obtained, as shown in Table 4. The internal pressure of the insulating body was 2 Pa, and the thermal conductivity was 0.0020 W/mK.

While the present Example employed the polypropylene (PP) as the thermoplastic resin in place of the high density polyethylene (HDPE) of Example 16 as described above, the sheet-shaped gas adsorbent having similar physical properties as in Example 16 was able to be obtained, and the insulating body employing this absorbent and exhibiting enhanced thermal insulation performance was able to be obtained.

Hence, even in the present Example 17, the sheet-shaped gas adsorbent, which was capable of adsorbing moisture within a range of the ambient temperature and under low partial pressure with large capacitance, was able to be produced. In addition, the blending quantity of the copper ion-exchanged ZSM-5 type zeolite over the thermoplastic resin and the temperature of the thermoplastic resin in thermal forming process were suitably limited, and further, the vacuum thermal processing was conducted for the copper ion-exchanged ZSM-5 type zeolite as the pretreatment, to allow inhibiting a generation of a crack, a cleavage, a discoloration or the like in the sheet-shaped gas adsorbent, and to present the thickness available for the production of the sheet as being equal to or smaller than 10 μm. Hence, even if this sheet-shaped gas adsorbent was employed, the appearance of the insulating body was not deteriorated.

Example 18

Nylon (Ny) having a softening point of 225 degrees C. was employed as the thermoplastic resin. Then, the copper ion-exchanged ZSM-5 type zeolite was blended so as to adjust 40 pbw over 100 pbw of the nylon, and the sheet-shaped gas adsorbent was extruded with an extruder. In addition to above, a vacuum thermal processing at 600 degrees C. for 4 hours was conducted for the copper ion-exchanged ZSM-5 type zeolite in advance. In addition, the heating temperature in the extrusion process (resin temperature during the forming) was 250 degrees C.

Further, the insulating body of the present example was produced by using the obtained sheet-shaped gas adsorbent in the similar procedure as employed in Example 10. Evaluation results of the obtained insulating body of the present example, and the sheet-shaped gas adsorbent applied for this insulating body, are shown in Table 4.

As shown in Table 4, good appearance of the sheet-shaped gas adsorbent without particular generation of a crack, a cleavage or the like in the sheet and without finding a discoloration was achieved. The resultant amount of absorbed moisture was: 81 mL/g at 3,000 Pa; and 2.8 mL/g at 10 Pa. In addition, the resultant amount of absorbed nitrogen was: 10.8 mL/g at 80,000 Pa; and 1.1 mL/g at 10 Pa. The resultant tensile strength was 180.9 MPa, and the resultant thickness available for the production of the sheet was 10 μm.

Further, concerning the appearance of the insulating body, the surface was smooth, and improved flatness was obtained, as shown in Table 4. The internal pressure of the insulating body was 2 Pa, and the thermal conductivity was 0.0020 W/mK.

While the present Example employed the nylon (Ny) as the thermoplastic resin in place of the high density polyethylene (HDPE) of Example 16 as described above, the sheet-shaped gas adsorbent having similar physical properties as in Example 16 was able to be obtained, and the insulating body employing this absorbent and exhibiting enhanced thermal insulation performance was able to be obtained.

Hence, even in the present Example 18, the sheet-shaped gas adsorbent, which was capable of adsorbing moisture within a range of the ambient temperature and under low partial pressure with large capacitance, was able to be produced. In addition, the blending quantity of the copper ion-exchanged ZSM-5 type zeolite over the thermoplastic resin and the temperature of the thermoplastic resin in thermal forming process were suitably limited, and further, the vacuum thermal processing was conducted for the copper ion-exchanged ZSM-5 type zeolite as the pretreatment, to allow inhibiting a generation of a crack, a cleavage, a discoloration or the like in the sheet-shaped gas adsorbent, and to present the thickness available for the production of the sheet as being equal to or smaller than 10 μm. Hence, even if this sheet-shaped gas adsorbent was employed, the appearance of the insulating body was not deteriorated.

Comparative Example 4

The insulating body of the present Comparative Example (comparative insulating body) was produced in the similar procedure as employed in Example 10, except that the sheet-shaped gas adsorbent was not employed. Evaluation results of the obtained comparative insulating body are shown in Table 4.

Concerning the appearance of the comparative insulating body, the surface was smooth, and improved flatness was obtained, as shown in Table 4. The internal pressure of the insulating body was 30 Pa, and the thermal conductivity was 0.0040 W/mK.

Comparative Example 5

High density polyethylene (HDPE) having a softening point of 130 degrees C. was employed as the thermoplastic resin. Then, the copper ion-exchanged X-type zeolite was blended so as to adjust 20 pbw over 100 pbw of the high density polyethylene, and the sheet-shaped gas adsorbent was extruded with an extruder.

Here, the copper ion-exchanged X-type zeolite is a product of the X-type zeolite that is a general-purpose zeolite commonly employed as the moisture adsorbent, on which ion exchanging with copper ion is carried out as described above, and no particular pretreatment was conducted for this copper ion-exchanged X-type zeolite. In addition, the heating temperature in the extrusion process (resin temperature during the forming) was 190 degrees C.

Further, the comparative insulating body of the present Comparative Example was produced by using the obtained sheet-shaped gas adsorbent in the similar procedure as employed in Example 10. Evaluation results of the obtained comparative insulating body, and the sheet-shaped gas adsorbent applied for this comparative insulating body, are shown in Table 4.

In the sheet-shaped gas adsorbent employing the copper ion-exchanged X-type zeolite in place of the copper ion-exchanged ZSM-5 type zeolite as shown in Table 4, the resultant amount of absorbed moisture was: 11 mL/g at 3,000 Pa; and 0 mL/g at 10 Pa, which indicated that the amount of absorbed moisture was decreased, as compared with the sheet-shaped gas adsorbent of Example 11 having the equivalent volume of the gas adsorbing component. In addition, the resultant amount of absorbed nitrogen was 0 mL/g for both conditions of 80,000 Pa and 10 Pa. In addition to above, good appearance without particular generation of a crack, a cleavage or the like in the sheet and without finding a discoloration was achieved. Further, the resultant tensile strength was 29 MPa, and the resultant thickness available for the production of the sheet was 10 μm.

Although the appearance of the comparative insulating body was that the surface was smooth and improved flatness was obtained as shown in Table 4, the internal pressure of insulating body was 20 Pa, and the thermal conductivity was 0.0040 W/mK. These evaluation values were larger than that of the insulating body of Example 11, and thus it was considered that the effects for reducing the internal pressure and the thermal conductivity by adsorbing the moisture are lower.

As described above, even if the ion exchanging with copper ion was conducted over the X-type zeolite that is the general-purpose zeolite to use the resultant zeolite as the gas adsorbing component, the amount of absorbed moisture of the obtained sheet-shaped gas adsorbent was lower than the amount of absorbed moisture of the sheet-shaped gas adsorbent of Example 10, and the obtained comparative insulating body was not able to exhibit sufficient thermal insulation performance. Hence, the sheet-shaped gas adsorbent obtained by employing the zeolite except the copper ion-exchanged ZSM-5 type zeolite is not preferable for adopting to the insulating body, which aims to exhibit enhanced thermal insulation performance.

Comparative Example 6

High density polyethylene (HDPE) having a softening point of 130 degrees C. was employed as the thermoplastic resin. Then, the copper ion-exchanged X-type zeolite was blended so as to adjust 40 pbw over 100 pbw of the high density polyethylene, and the sheet-shaped gas adsorbent was extruded with an extruder.

Here, the copper ion-exchanged X-type zeolite is a product of the X-type zeolite that is a general-purpose zeolite commonly employed as the moisture adsorbent, on which ion exchanging with copper ion is carried out as described above, and a vacuum thermal processing at 600 degrees C. for 4 hours was conducted for the copper ion-exchanged X-type zeolite in advance. In addition, the heating temperature in the extrusion process (resin temperature during the forming) was 190 degrees C.

Further, the comparative insulating body of the present Comparative Example was produced by using the obtained sheet-shaped gas adsorbent in the similar procedure as employed in Example 10. Evaluation results of the obtained comparative insulating body, and the sheet-shaped gas adsorbent applied for this comparative insulating body, are shown in Table 4.

In the sheet-shaped gas adsorbent employing the copper ion-exchanged X-type zeolite in place of the copper ion-exchanged ZSM-5 type zeolite as shown in Table 4, the resultant amount of absorbed moisture was: 23 mL/g at 3,000 Pa; and 0 mL/g at 10 Pa, which indicated that the amount of absorbed moisture was decreased, as compared with the sheet-shaped gas adsorbent of Example 2 having the equivalent volume of the gas adsorbing component. Despite the copper ion-exchanged X-type zeolite was preliminarily treated with the vacuum thermal processing similarly as in the case of the copper ion-exchanged ZSM-5 type zeolite, the resultant amount of absorbed nitrogen was 0 mL/g for both conditions of 80,000 Pa and 10 Pa. In addition to above, good appearance without particular generation of a crack, a cleavage or the like in the sheet and without finding a discoloration was achieved. Further, the resultant tensile strength was 28.4 MPa, and the resultant thickness available for the production of the sheet was 10 μm.

Although the appearance of the comparative insulating body was that the surface was smooth and improved flatness was obtained as shown in Table 4, the internal pressure of insulating body was 21 Pa, and the thermal conductivity was 0.0037 W/mK. These evaluation values were larger than that of the insulating body of Example 11, and thus it was considered that the effects for reducing the internal pressure and the thermal conductivity by adsorbing the moisture are lower.

As described above, it was found that, even if the ion exchanging with copper ion was conducted over the X-type zeolite that is the general-purpose zeolite to use the resultant zeolite as the gas adsorbing component, the amount of absorbed moisture of the obtained sheet-shaped gas adsorbent was lower than the amount of absorbed moisture of the sheet-shaped gas adsorbent of Example 10. It was also found that the amount of absorbed moisture and the amount of absorbed nitrogen were reduced, even though the blending quantity of the copper ion-exchanged X-type zeolite was increased as compared with the sheet-shaped gas adsorbent of Example 10. In addition, even though the vacuum thermal processing at 600 degrees C. for 4 hours was conducted over the copper ion-exchanged X-type zeolite, the obtained sheet-shaped gas adsorbent exhibited no nitrogen adsorptive performance. Hence, the obtained comparative insulating body was not able to exhibit sufficient thermal insulation performance. Hence, the sheet-shaped gas adsorbent obtained by employing the zeolite except the copper ion-exchanged ZSM-5 type zeolite is not preferable for adopting to the insulating body, which aims to exhibit enhanced thermal insulation performance, even if the vacuum thermal processing was conducted as the pretreatment.

Comparative Example 7

Evaluations of the amount of absorbed moisture of the commercially available calcium oxide itself alone, which is a general-purpose moisture adsorbent, were conducted similarly as in Examples 1 to 9. In addition to above, the evaluations were conducted without blending calcium oxide into a thermoplastic resin to form a sheet-like form.

Further, the comparative insulating body of the present Comparative Example was produced by using this commercially available calcium oxide in the similar procedure as employed in Example 10. Evaluation results of the obtained comparative insulating body, and calcium oxide applied for this comparative insulating body, are shown in Table 4.

As shown in Table 4, the resultant amount of absorbed moisture of calcium oxide was: 10.8 mL/g at 3,000 Pa; and 0.1 mL/g at 10 Pa, which indicated that the amount of absorbed moisture was lower as compared with the sheet-shaped gas adsorbents of Examples 10 to 18.

Further, as shown in Table 4, considerable convex was generated on the surface in the appearance of the comparative insulating body, and thus good flatness was not obtained. Further, the internal pressure of the insulating body was 20 Pa, and the thermal conductivity was 0.0040 W/mK. These evaluation values were larger than that of the insulating body of Example 11, and thus it was considered that the effects for reducing the internal pressure and the thermal conductivity by adsorbing the moisture are lower.

In addition, since calcium oxide is employed as the "gas adsorbing component" ordinarily in a conformation of granular or powder calcium oxide encapsulated within a nonwoven fabric, the appearance of the comparative insulating body was not inappropriate, since considerable convex was generated in the location where "the gas adsorbing component" was disposed as described above.

It is apparent from the above-described descriptions that there are a number of modifications and/or alternative embodiments of the present invention for a person having ordinary skills in the art. Therefore, it is understood that the above-described descriptions are for illustrative purpose only, and are presented for the purpose of teaching those skilled in the art the best mode for carrying out the present invention. Various modifications, additions and alterations of the structures and/or the functions thereof may be substantially made to the invention without departing from the spirit and scope of the invention.

INDUSTRIAL APPLICABILITY

The sheet-shaped gas adsorbent according to the present invention is capable of adsorbing the moisture of low partial pressure at a temperature within the range of the ambient temperature with increased absorbing capacity, and is also preferably capable of being widely employed for the applications for adsorbing the air. For example, this may be preferably employed for a precision apparatus or a low-profile device, which has a need for highly eliminating the water and the air but has no sufficient space for housing the gas adsorbent in the interior of the device. Further, the insulating body according to the present invention contains the aforementioned sheet-shaped gas adsorbent, so that enhanced thermal insulation performance is exhibited with relatively thinner body. Hence, this can be preferably applicable to a precision apparatus or a low-profile device, which has no sufficient space occupied by the insulating body, and in addition, can be preferably applicable to applications, for which a creation of a new space by reducing the space occupied by the insulating body is desired.

REFERENCE CITATION LISTS 10 single layer sheet-shaped gas adsorbent
11 thermoplastic resin sheet
12 copper ion-exchanged ZSM-5 type zeolite
20 triple-layered the sheet-shaped gas adsorbent
21 overlying member
22 underlying member
30 insulating body
31 core member
32 sheath member
321 surface protective layer
322 gas barrier layer
323 thermally welded layer

The invention claimed is:
1. A sheet-shaped gas adsorbent,
comprising: a thermoplastic resin; and ZSM-5 (Zeolite Socony Mobil-#5) type zeolite treated by an ion exchange with copper ion,
wherein said ZSM-5 type zeolite is dispersed in said thermoplastic resin, and said thermoplastic resin is thermally formed to a sheet-like shape, and
wherein a blending quantity of said ZSM-5 type zeolite is equal to or lower than 40 parts by weight (pbw) when an amount of said thermoplastic resin is defined as 100 pbw.
2. The sheet-shaped gas adsorbent according to claim 1,
wherein the temperature of the thermoplastic resin in said thermally forming is equal to or lower than a heating upper limit temperature, which is higher than the softening point of the thermoplastic resin by 60 degrees C.
3. The sheet-shaped gas adsorbent according to claim 2,
wherein said ZSM-5 type zeolite treated by the ion exchange with copper ion is subjected to a thermal drying processing before being blended to said thermoplastic resin and thermally formed to the sheet-like shape.

4. The sheet-shaped gas adsorbent according to claim 2, wherein said ZSM-5 type zeolite treated by the ion exchange with copper ion is subjected to a vacuum thermal processing before being blended to said thermoplastic resin and thermally formed to the sheet-like shape.

5. The sheet-shaped gas adsorbent according to claim 1, wherein said sheet-shaped gas adsorbent is present as an intermediate layer, and
said sheet-shaped gas adsorbent further comprises an overlying member and an underlying member, both of which are laminated to said intermediate layer.

6. The sheet-shaped gas adsorbent according to claim 1, wherein said thermoplastic resin is at least one selected from the group consisting of vinyl resins, acrylic resins, acrylonitrile-styrene based resins, polyamide resins, polyester resins, and polycarbonate.

7. An insulating body,
comprising:
a core member,
a sheet-shaped gas adsorbent; and
a sheath member having gas barrier ability,
wherein said sheet-shaped gas adsorbent comprises ZSM-5 type zeolite treated by an ion exchange with copper ion and a thermoplastic resin,
wherein said ZSM-5 type zeolite is dispersed in said thermoplastic resin, and said thermoplastic resin is thermally formed to a sheet-like shape,
wherein a blending quantity of said ZSM-5 type zeolite is equal to or lower than 40 parts by weight (pbw) when an amount of said thermoplastic resin is defined as 100 pbw, and
wherein an interior of said sheath member is decompressed.

8. The insulating body according to claim 7, wherein the temperature of the thermoplastic resin in said thermally forming is equal to or lower than a heating upper limit temperature, which is higher than the softening point of the thermoplastic resin by 60 degrees C.

9. The insulating body according to claim 8, wherein said ZSM-5 type zeolite treated by the ion exchange with copper ion in said sheet-shaped gas adsorbent is subjected to a thermal drying processing before being blended to said thermoplastic resin and is thermally formed to the sheet-like shape.

10. The insulating body according to claim 8, wherein said ZSM-5 type zeolite treated by the ion exchange with copper ion in said sheet-shaped gas adsorbent is subjected to a vacuum thermal processing before being blended to said thermoplastic resin and is thermally formed to the sheet-like shape.

11. The insulating body according to claim 7, wherein said sheet-shaped gas adsorbent is integrated with the inside of said sheath member.

12. The insulating body according to claim 7, wherein said thermoplastic resin is at least one selected from the group consisting of vinyl resins, acrylic resins, acrylonitrile-styrene based resins, polyamide resins, polyester resins, and polycarbonate.

* * * * *